(12) United States Patent
Nguyen et al.

(10) Patent No.: US 8,287,379 B2
(45) Date of Patent: Oct. 16, 2012

(54) DISTRIBUTED GAME SERVICES

(75) Inventors: Binh T. Nguyen, Reno, NV (US); Jamal Benbrahim, Reno, NV (US); Mark Bansemer, Reno, NV (US)

(73) Assignee: IGT, Reno, NV (US)

( * ) Notice: Subject to any disclaimer, the term of this patent is extended or adjusted under 35 U.S.C. 154(b) by 1174 days.

(21) Appl. No.: 11/225,337

(22) Filed: Sep. 12, 2005

(65) Prior Publication Data

US 2007/0060363 A1    Mar. 15, 2007

(51) Int. Cl.
*A63F 13/00*    (2006.01)
(52) U.S. Cl. ............... 463/42; 463/29; 463/40; 463/41; 463/43
(58) Field of Classification Search ............... 463/40–42
See application file for complete search history.

(56) References Cited

U.S. PATENT DOCUMENTS

| | | |
|---|---|---|
| 3,931,504 A | 1/1976 | Jacoby |
| 4,072,930 A | 2/1978 | Lucero et al. |
| 4,335,809 A | 6/1982 | Wain |
| 4,430,728 A | 2/1984 | Beitel et al. |
| 4,454,594 A | 6/1984 | Heffron et al. |
| 4,468,750 A | 8/1984 | Chamoff et al. |
| 4,532,416 A | 7/1985 | Berstein |
| 4,572,509 A | 2/1986 | Sitrick |
| 4,582,324 A | 4/1986 | Koza et al. |
| 4,607,844 A | 8/1986 | Fullerton |
| 4,652,998 A | 3/1987 | Koza et al. |
| 4,689,742 A | 8/1987 | Troy et al. |
| 4,856,787 A | 8/1989 | Itkis |
| 4,868,900 A | 9/1989 | McGuire |
| 5,103,079 A | 4/1992 | Barakai et al. |

(Continued)

FOREIGN PATENT DOCUMENTS

AU    199650576    4/1997

(Continued)

OTHER PUBLICATIONS

Nguyen, et al. "Method and System for Instant-On Game Download," U.S. Appl. No. 11/224,814, filed Sep. 12, 2005.

(Continued)

*Primary Examiner* — Ronald Laneau
*Assistant Examiner* — Justin Myhr
(74) *Attorney, Agent, or Firm* — Weaver, Austin, Villeneuve & Sampson, LLP

(57) ABSTRACT

Disclosed are methods, apparatus, and systems, including computer program products, implementing and using techniques for providing a game of chance. A local gaming machine is in communication with a remote gaming machine over a data network. A player input is received at an input terminal of the local gaming machine. The player input requests a game application. The requested game application is located at the remote gamine machine. It is determined whether interface requirements of the requested game application are compatible with an interface of the local gaming machine. It is also determined whether the requested game application is available for execution on the remote gaming machine. In some embodiments, determining availability of the requested game application includes determining compliance with interface requirements, licensing requirements and/or jurisdictional requirements. When the requirements are compatible and the requested game application is available for execution, an instance of the requested game application is reserved on the remote gaming machine. When the instance is executed on the remote gaming machine, output data is sent to the local gaming machine over the data network. One or more game parameters can be captured from the received output data.

68 Claims, 22 Drawing Sheets

U.S. PATENT DOCUMENTS

| | | |
|---|---|---|
| 5,136,644 A | 8/1992 | Audebert et al. |
| 5,149,945 A | 9/1992 | Johnson et al. |
| 5,155,837 A | 10/1992 | Liu et al. |
| 5,265,874 A | 11/1993 | Dickinson et al. |
| 5,286,062 A | 2/1994 | Greenwood et al. |
| 5,290,033 A | 3/1994 | Bittner et al. |
| 5,342,047 A | 8/1994 | Heidel et al. |
| 5,348,299 A | 9/1994 | Clapper, Jr. |
| 5,397,125 A | 3/1995 | Adams |
| 5,410,703 A | 4/1995 | Nilsson et al. |
| 5,421,009 A | 5/1995 | Platt |
| 5,421,017 A | 5/1995 | Scholz et al. |
| 5,466,920 A | 11/1995 | Nair et al. |
| 5,473,772 A | 12/1995 | Halliwell et al. |
| 5,487,544 A | 1/1996 | Clapper, Jr. |
| 5,489,096 A | 2/1996 | Aron |
| 5,491,812 A | 2/1996 | Pisello et al. |
| 5,555,418 A | 9/1996 | Nilsson et al. |
| 5,609,337 A | 3/1997 | Clapper, Jr. |
| 5,611,730 A | 3/1997 | Weiss |
| 5,643,086 A | 7/1997 | Alcorn et al. |
| 5,645,485 A | 7/1997 | Clapper, Jr. |
| 5,647,592 A | 7/1997 | Gerow |
| 5,654,746 A | 8/1997 | McMullan, Jr. et al. |
| 5,655,961 A | 8/1997 | Acres et al. |
| 5,671,412 A | 9/1997 | Christiano |
| 5,682,533 A | 10/1997 | Siljestroemer |
| 5,684,750 A | 11/1997 | Kondoh et al. |
| 5,688,174 A | 11/1997 | Kennedy |
| 5,702,304 A | 12/1997 | Acres et al. |
| 5,715,403 A | 2/1998 | Stefik |
| 5,715,462 A | 2/1998 | Iwamoto et al. |
| 5,741,183 A | 4/1998 | Acres et al. |
| 5,749,784 A | 5/1998 | Clapper, Jr. |
| 5,752,882 A | 5/1998 | Acres et al. |
| 5,759,102 A | 6/1998 | Pease et al. |
| 5,761,647 A | 6/1998 | Boushy |
| 5,762,552 A | 6/1998 | Vuong et al. ............... 463/25 |
| 5,766,076 A | 6/1998 | Pease et al. |
| 5,768,382 A | 6/1998 | Schneier et al. |
| 5,770,533 A | 6/1998 | Franchi |
| 5,779,545 A | 7/1998 | Berg et al. |
| 5,779,549 A | 7/1998 | Walker et al. |
| 5,797,795 A * | 8/1998 | Takemoto et al. ............... 463/42 |
| 5,800,269 A | 9/1998 | Holch et al. |
| 5,819,107 A | 10/1998 | Lichtman et al. |
| 5,820,459 A | 10/1998 | Acres et al. |
| 5,828,843 A | 10/1998 | Grimm et al. |
| 5,833,540 A | 11/1998 | Miodunski et al. |
| 5,836,817 A | 11/1998 | Acres et al. |
| 5,845,077 A | 12/1998 | Fawcett |
| 5,845,090 A | 12/1998 | Collins et al. |
| 5,845,902 A | 12/1998 | Takemoto |
| 5,848,064 A | 12/1998 | Cowan |
| 5,851,149 A | 12/1998 | Xidos et al. |
| 5,855,515 A | 1/1999 | Pease et al. |
| 5,870,723 A | 2/1999 | Pare, Jr. et al. |
| 5,871,400 A | 2/1999 | Yfantis |
| 5,876,284 A | 3/1999 | Acres et al. |
| 5,885,158 A | 3/1999 | Torango et al. |
| 5,896,566 A | 4/1999 | Averbuch et al. |
| 5,902,983 A | 5/1999 | Crevelt et al. |
| 5,905,523 A | 5/1999 | Woodfield et al. |
| 5,925,127 A | 7/1999 | Ahmad |
| 5,935,000 A | 8/1999 | Sanchez, III et al. |
| 5,941,771 A | 8/1999 | Haste, III |
| 5,943,241 A | 8/1999 | Nichols et al. |
| 5,949,042 A | 9/1999 | Dietz, II et al. |
| 5,970,143 A | 10/1999 | Schneier et al. |
| 5,971,855 A | 10/1999 | Ng |
| 5,980,384 A | 11/1999 | Barrie |
| 5,980,385 A | 11/1999 | Clapper, Jr. |
| 5,987,376 A | 11/1999 | Olson et al. |
| 5,999,808 A | 12/1999 | LaDue et al. |
| 6,001,016 A | 12/1999 | Walker et al. ............... 463/42 |
| 6,002,772 A | 12/1999 | Saito |
| 6,003,013 A | 12/1999 | Boushy et al. |
| 6,006,034 A | 12/1999 | Heath et al. |
| 6,009,458 A | 12/1999 | Hawkins et al. |
| 6,029,046 A | 2/2000 | Khan et al. |
| 6,038,666 A | 3/2000 | Hsu et al. |
| 6,047,128 A | 4/2000 | Zander |
| 6,047,324 A | 4/2000 | Ford |
| 6,048,269 A | 4/2000 | Burns et al. |
| 6,052,512 A | 4/2000 | Peterson et al. |
| 6,071,190 A | 6/2000 | Weiss et al. |
| 6,098,837 A | 8/2000 | Izawa et al. |
| 6,099,408 A | 8/2000 | Schneier et al. |
| 6,104,815 A | 8/2000 | Alcorn et al. |
| 6,106,396 A | 8/2000 | Alcorn et al. |
| 6,113,098 A | 9/2000 | Adams |
| 6,113,492 A | 9/2000 | Walker et al. |
| 6,113,495 A | 9/2000 | Walker et al. |
| 6,125,185 A | 9/2000 | Boesch |
| 6,135,884 A | 10/2000 | Hedrick et al. |
| 6,135,887 A | 10/2000 | Pease et al. |
| 6,146,277 A | 11/2000 | Ikeda |
| 6,149,522 A | 11/2000 | Alcorn et al. |
| 6,154,878 A | 11/2000 | Saboff |
| 6,159,098 A | 12/2000 | Slomiany et al. |
| 6,165,072 A | 12/2000 | Davis et al. |
| 6,169,976 B1 | 1/2001 | Colosso |
| 6,178,510 B1 | 1/2001 | O'Connor et al. |
| 6,183,362 B1 | 2/2001 | Boushy |
| 6,190,256 B1 | 2/2001 | Walker et al. |
| 6,193,152 B1 | 2/2001 | Fernando et al. |
| 6,193,608 B1 | 2/2001 | Walker et al. |
| 6,199,107 B1 | 3/2001 | Duari |
| 6,219,836 B1 | 4/2001 | Wells et al. |
| 6,253,374 B1 | 6/2001 | Dresevic et al. |
| 6,254,483 B1 | 7/2001 | Acres |
| 6,264,561 B1 | 7/2001 | Saffari et al. |
| 6,280,328 B1 | 8/2001 | Holch et al. |
| 6,285,868 B1 | 9/2001 | LaDue |
| 6,285,886 B1 | 9/2001 | Kamel et al. |
| 6,293,865 B1 | 9/2001 | Kelly et al. |
| 6,302,793 B1 | 10/2001 | Fertitta, III et al. |
| 6,306,035 B1 | 10/2001 | Kelly et al. |
| 6,310,873 B1 | 10/2001 | Rainis et al. |
| 6,315,663 B1 | 11/2001 | Sakamoto |
| 6,317,827 B1 | 11/2001 | Cooper |
| 6,328,648 B1 | 12/2001 | Walker et al. |
| 6,340,331 B1 | 1/2002 | Saunders et al. |
| 6,343,990 B1 | 2/2002 | Rasmussen et al. |
| 6,347,996 B1 | 2/2002 | Gilmore et al. |
| 6,351,688 B1 | 2/2002 | Nichols et al. |
| 6,364,769 B1 | 4/2002 | Weiss et al. |
| 6,368,216 B1 | 4/2002 | Hedrick et al. |
| 6,368,219 B1 | 4/2002 | Szrek et al. |
| 6,371,852 B1 | 4/2002 | Acres |
| 6,402,618 B1 | 6/2002 | Reed et al. |
| 6,409,602 B1 | 6/2002 | Wiltshire et al. |
| 6,446,257 B1 | 9/2002 | Pradhan et al. |
| 6,449,687 B1 | 9/2002 | Moriya |
| 6,453,319 B1 | 9/2002 | Mattis et al. |
| 6,454,648 B1 | 9/2002 | Kelly et al. |
| 6,488,585 B1 | 12/2002 | Wells et al. |
| 6,508,709 B1 | 1/2003 | Karmarkar |
| 6,508,710 B1 | 1/2003 | Paravia et al. |
| 6,554,705 B1 | 4/2003 | Cumbers |
| 6,575,829 B2 | 6/2003 | Coleman et al. |
| 6,607,439 B2 | 8/2003 | Schneier et al. |
| 6,625,661 B1 | 9/2003 | Baldwin, Jr. |
| 6,638,170 B1 | 10/2003 | Crumby |
| 6,645,077 B2 | 11/2003 | Rowe |
| 6,645,078 B1 | 11/2003 | Mattice |
| 6,652,378 B2 | 11/2003 | Cannon et al. |
| 6,656,040 B1 | 12/2003 | Brosnan et al. |
| 6,666,765 B2 | 12/2003 | Vancura |
| 6,682,423 B2 | 1/2004 | Brosnan et al. |
| 6,684,195 B1 | 1/2004 | Deaton et al. |
| 6,739,973 B1 | 5/2004 | Lucchesi et al. |
| 6,745,236 B1 | 6/2004 | Hawkins et al. |
| 6,749,502 B2 | 6/2004 | Baerlocher |
| 6,749,510 B2 | 6/2004 | Giobbi |
| 6,785,291 B1 | 8/2004 | Cao et al. |
| 6,805,634 B1 | 10/2004 | Wells et al. |

| | | |
|---|---|---|
| 6,853,973 B2 | 2/2005 | Mathews et al. |
| 6,866,586 B2 | 3/2005 | Oberberger et al. |
| 6,875,110 B1 | 4/2005 | Crumby |
| 6,896,618 B2 | 5/2005 | Benoy et al. |
| 6,908,387 B2 | 6/2005 | Hedrick et al. |
| 6,910,079 B2 | 6/2005 | Zimmermann et al. |
| 6,913,531 B1 | 7/2005 | Yoseloff |
| 6,935,946 B2 | 8/2005 | Yoseloff et al. |
| 6,962,530 B2 | 11/2005 | Jackson |
| 6,988,267 B2 | 1/2006 | Harris et al. |
| 6,997,803 B2 | 2/2006 | LeMay et al. |
| 7,127,069 B2 | 10/2006 | Nguyen |
| 7,168,089 B2 | 1/2007 | Nguyen et al. |
| 7,318,775 B2 | 1/2008 | Brosnan et al. |
| 7,399,229 B2 | 7/2008 | Rowe |
| 7,438,643 B2 | 10/2008 | Brosnan et al. |
| 7,455,591 B2 | 11/2008 | Nguyen |
| 7,470,182 B2 | 12/2008 | Martinek et al. |
| 7,480,857 B2 | 1/2009 | Benbrahim et al. |
| 7,515,718 B2 | 4/2009 | Nguyen et al. |
| 7,618,317 B2 | 11/2009 | Jackson |
| 7,636,859 B2 | 12/2009 | Little et al. |
| 7,780,526 B2 | 8/2010 | Nguyen et al. |
| 7,785,204 B2 | 8/2010 | Wells et al. |
| 7,801,303 B2 | 9/2010 | Dulac |
| 7,828,654 B2 | 11/2010 | Carter, Sr. |
| 7,887,420 B2 | 2/2011 | Nguyen et al. |
| 7,951,002 B1* | 5/2011 | Brosnan .............. 463/42 |
| 7,972,214 B2 | 7/2011 | Kinsley et al. |
| 7,988,559 B2 | 8/2011 | Yoseloff et al. |
| 8,057,298 B2 | 11/2011 | Nguyen et al. |
| 2001/0021666 A1 | 9/2001 | Yoshida et al. |
| 2001/0031663 A1 | 10/2001 | Johnson |
| 2001/0036854 A1 | 11/2001 | Okuniewicz |
| 2001/0036855 A1 | 11/2001 | DeFrees-Parrott et al. |
| 2001/0039210 A1 | 11/2001 | St-Denis |
| 2001/0044337 A1* | 11/2001 | Rowe et al. ............. 463/29 |
| 2001/0044339 A1 | 11/2001 | Cordero et al. |
| 2001/0053712 A1 | 12/2001 | Yoseloff et al. |
| 2002/0002075 A1 | 1/2002 | Rowe |
| 2002/0016202 A1 | 2/2002 | Fertitta et al. |
| 2002/0022516 A1 | 2/2002 | Forden |
| 2002/0028706 A1 | 3/2002 | Barnard et al. |
| 2002/0034980 A1 | 3/2002 | Lemmons et al. |
| 2002/0045477 A1 | 4/2002 | Dabrowski |
| 2002/0049909 A1 | 4/2002 | Jackson et al. |
| 2002/0050683 A1 | 5/2002 | Hirota |
| 2002/0071557 A1 | 6/2002 | Nguyen |
| 2002/0093136 A1 | 7/2002 | Moody |
| 2002/0107065 A1 | 8/2002 | Rowe |
| 2002/0111205 A1 | 8/2002 | Beavers |
| 2002/0116615 A1 | 8/2002 | Nguyen et al. |
| 2002/0132662 A1* | 9/2002 | Sharp et al. ............. 463/25 |
| 2002/0137217 A1 | 9/2002 | Rowe |
| 2002/0142844 A1* | 10/2002 | Kerr .............. 463/42 |
| 2002/0151359 A1 | 10/2002 | Rowe |
| 2002/0155887 A1 | 10/2002 | Criss-Puszkiewicz et al. |
| 2003/0009542 A1 | 1/2003 | Kasal et al. |
| 2003/0032485 A1 | 2/2003 | Cockerille |
| 2003/0036425 A1 | 2/2003 | Kaminkow et al. |
| 2003/0045356 A1 | 3/2003 | Thomas |
| 2003/0054878 A1 | 3/2003 | Benoy et al. |
| 2003/0064771 A1 | 4/2003 | Morrow et al. |
| 2003/0064805 A1* | 4/2003 | Wells .............. 463/39 |
| 2003/0069074 A1 | 4/2003 | Jackson |
| 2003/0074323 A1 | 4/2003 | Catan |
| 2003/0095791 A1 | 5/2003 | Barton et al. |
| 2003/0100371 A1 | 5/2003 | Gatto et al. |
| 2003/0157979 A1 | 8/2003 | Cannon et al. |
| 2003/0176213 A1 | 9/2003 | LeMay et al. |
| 2003/0186734 A1 | 10/2003 | LeMay et al. |
| 2003/0187853 A1 | 10/2003 | Hensley et al. |
| 2003/0188306 A1 | 10/2003 | Harris et al. |
| 2004/0002385 A1 | 1/2004 | Nguyen |
| 2004/0048671 A1 | 3/2004 | Rowe |
| 2004/0067794 A1* | 4/2004 | Coetzee .............. 463/42 |
| 2004/0092310 A1 | 5/2004 | Brosnan et al. |
| 2004/0147314 A1 | 7/2004 | LeMay et al. ............. 463/30 |
| 2004/0152517 A1* | 8/2004 | Hardisty et al. ............. 463/42 |
| 2004/0166931 A1 | 8/2004 | Criss-Puszkiewicz et al. |
| 2004/0180722 A1* | 9/2004 | Giobbi .............. 463/42 |
| 2004/0242322 A1 | 12/2004 | Montagna et al. |
| 2004/0248651 A1 | 12/2004 | Gagner |
| 2004/0259640 A1 | 12/2004 | Gentles et al. |
| 2005/0059470 A1 | 3/2005 | Cannon .............. 463/19 |
| 2005/0108519 A1 | 5/2005 | Barton et al. |
| 2005/0108769 A1 | 5/2005 | Arnold et al. |
| 2005/0113172 A1 | 5/2005 | Gong |
| 2005/0120040 A1 | 6/2005 | Williams et al. |
| 2005/0137016 A1 | 6/2005 | Enzminger et al. |
| 2005/0153778 A1 | 7/2005 | Nelson et al. |
| 2005/0192099 A1 | 9/2005 | Nguyen et al. .............. 463/42 |
| 2005/0216942 A1 | 9/2005 | Barton |
| 2005/0221898 A1* | 10/2005 | Gatto et al. .............. 463/42 |
| 2005/0288080 A1 | 12/2005 | Lockton et al. |
| 2006/0009273 A2 | 1/2006 | Moshal |
| 2006/0019749 A1 | 1/2006 | Merati et al. |
| 2006/0035713 A1 | 2/2006 | Cockerille et al. |
| 2006/0046855 A1 | 3/2006 | Nguyen et al. |
| 2006/0068871 A1 | 3/2006 | Crawford et al. |
| 2006/0073869 A1 | 4/2006 | LeMay et al. |
| 2006/0160621 A1 | 7/2006 | Rowe et al. |
| 2006/0247028 A1 | 11/2006 | Brosnan et al. |
| 2006/0258428 A1 | 11/2006 | Blackburn et al. |
| 2006/0264256 A1 | 11/2006 | Gagner et al. |
| 2006/0281541 A1 | 12/2006 | Nguyen et al. |
| 2007/0004506 A1 | 1/2007 | Kinsley et al. |
| 2007/0026935 A1 | 2/2007 | Wolf et al. |
| 2007/0032301 A1 | 2/2007 | Acres et al. |
| 2007/0060361 A1 | 3/2007 | Nguyen et al. |
| 2007/0178970 A1 | 8/2007 | LeMay et al. |
| 2007/0207852 A1 | 9/2007 | Nelson et al. |
| 2007/0270213 A1 | 11/2007 | Nguyen et al. |
| 2008/0090654 A1 | 4/2008 | Okada |
| 2008/0192058 A1 | 8/2008 | Liu et al. |
| 2009/0209332 A1 | 8/2009 | Soukup et al. |
| 2010/0099491 A1 | 4/2010 | Little et al. |
| 2011/0105234 A1 | 5/2011 | Nguyen et al. |
| 2011/0218038 A1 | 9/2011 | Kinsley et al. |
| 2011/0281655 A1 | 11/2011 | Nguyen et al. |

FOREIGN PATENT DOCUMENTS

| | | |
|---|---|---|
| DE | 197 30 002 A1 | 12/1997 |
| EP | 0 689 325 | 6/1995 |
| EP | 0 706 275 | 4/1996 |
| EP | 0 715 245 | 6/1996 |
| EP | 0 744 786 | 11/1996 |
| EP | 0 769 769 | 4/1997 |
| EP | 0 841 615 | 5/1998 |
| EP | 0 905 614 | 3/1999 |
| EP | 1004970 | 5/2000 |
| EP | 1 061 430 | 12/2000 |
| EP | 1 074 955 | 2/2001 |
| EP | 1 199 690 | 4/2002 |
| EP | 1231577 | 8/2002 |
| EP | 1 255 234 | 11/2002 |
| EP | 1291048 A2 | 3/2003 |
| EP | 1 391 226 | 2/2004 |
| EP | 1 396 829 | 3/2004 |
| EP | 1 414 534 | 5/2004 |
| EP | 1473682 | 11/2004 |
| EP | 1 895 483 | 3/2008 |
| GB | 2 151 054 | 7/1985 |
| GB | 2 251 112 | 6/1992 |
| GB | 2 392 276 | 10/2004 |
| JP | 10-277243 | 10/1998 |
| JP | 2002-197332 | 7/2002 |
| RU | 2124230 | 12/1998 |
| WO | WO 95/24689 | 9/1995 |
| WO | WO 96/00950 | 1/1996 |
| WO | WO97/30549 | 8/1997 |
| WO | WO 98/40141 | 9/1998 |
| WO | WO 99/00164 | 1/1999 |
| WO | WO 99/01188 | 1/1999 |
| WO | WO00/67424 | 11/2000 |
| WO | WO 01/20424 | 3/2001 |
| WO | WO 01/99067 | 12/2001 |
| WO | WO01/99067 | 12/2001 |

| | | |
|---|---|---|
| WO | WO 02/01350 | 1/2002 |
| WO | WO 02/05229 | 1/2002 |
| WO | WO 02/17251 | 2/2002 |
| WO | WO 02/21468 | 3/2002 |
| WO | WO 02/073501 | 9/2002 |
| WO | WO 02/077935 | 10/2002 |
| WO | WO 03/006129 | 1/2003 |
| WO | WO 03/019486 | 6/2003 |
| WO | WO 03/085613 | 10/2003 |
| WO | WO 2004/021290 | 3/2004 |
| WO | WO 2007/005290 | 1/2007 |
| WO | WO 2007/032879 | 3/2007 |
| WO | WO 2007/032888 | 3/2007 |
| WO | WO 2007/044175 | 4/2007 |
| WO | WO 2007/120450 | 10/2007 |
| WO | WO 2008/016610 | 2/2008 |
| WO | WO 2010/045004 | 4/2010 |

OTHER PUBLICATIONS

William R. Brosnan, "Using a Gaming Machines as a Server," U.S. Appl. No. 09/595,798, filed Jun. 16, 2000.
International Search Report and Written Opinion dated Dec. 4, 2006 for International application No. PCT/US2006/033429, filed on Aug. 24, 2006.
Chinese Office Action dated Oct. 9, 2009 issued in 2006800335028.
First Office Action for Australian Application No. 2006291294, dated Nov. 18, 2010.
Second Office Action for Australian Application No. 2006291294, dated Feb. 14, 2011.
U.S. Appl. No. 09/642,192, dated Aug. 18, 2000, LeMay et al.
U.S. Appl. No. 13/188,281, dated Jul. 21, 2011, Nguyen et al.
U.S. Office Action dated Jul. 15, 2002 issued in U.S. Appl. No. 09/595,798.
U.S. Final Office Action dated Mar. 20, 2003 issued in U.S. Appl. No. 09/595,798.
U.S. Advisory Action dated May 21, 2003 issued in U.S. Appl. No. 09/595,798.
U.S. Office Action dated Jul. 1, 2003 issued in U.S. Appl. No. 09/595,798.
U.S. Office Action dated Jan. 14, 2004 issued in U.S. Appl. No. 09/595,798.
U.S. Final Office Action dated Jun. 3, 2004 issued in U.S. Appl. No. 09/595,798.
U.S. Office Action dated Jan. 28, 2005 issued in U.S. Appl. No. 09/595,798.
U.S. Final Office Action dated May 3, 2006 issued in U.S. Appl. No. 09/595,798.
U.S. Office Action dated Sep. 6, 2006 issued in U.S. Appl. No. 09/595,798.
U.S. Final Office Action dated Mar. 14, 2007 issued in U.S. Appl. No. 09/595,798.
U.S. Decision Pre-Appeal dated Sep. 14, 2007 issued in U.S. Appl. No. 09/595,798.
U.S. Notice of Petition Granted re Notice of Abandonment Vacated dated Jun. 24, 2009 issued in U.S. Appl. No. 09/595,798.
U.S. Office Action dated Sep. 16, 2009 issued in U.S. Appl. No. 09/595,798.
U.S. Notice of Allowance and Allowability dated May 14, 2010 issued in U.S. Appl. No. 09/595,798.
U.S. Notice of Allowance and Allowability dated Sep. 20, 2010 issued in U.S. Appl. No. 09/595,798.
U.S. Notice of Allowance dated Jan. 7, 2011 issued in U.S. Appl. No. 09/595,798.
U.S. Office Action dated Jul. 1, 2002 issued in U.S. Appl. No. 09/642,192.
U.S. Final Office Action dated Jan. 2, 2003 issued in U.S. Appl. No. 09/642,192.
U.S. Advisory Action dated Jan. 29, 2003 issued in U.S. Appl. No. 09/642,192.
U.S. Office Action dated Apr. 21, 2003 issued in U.S. Appl. No. 09/642,192.
U.S. Final Office Action dated Sep. 30, 2003 issued in U.S. Appl. No. 09/642,192.
U.S. Advisory Action dated Nov. 6, 2003 issued in U.S. Appl. No. 09/642,192.
U.S. Office Action dated Feb. 10, 2004 issued in U.S. Appl. No. 09/642,192.
U.S. Office Action dated Jul. 1, 2004 issued in U.S. Appl. No. 09/642,192.
U.S. Notice of Informal or Non-Responsive RCE Amendment dated Jan. 11, 2006 issued in U.S. Appl. No. 09/642,192.
U.S. Final Office Action dated Mar. 28, 2006 issued in U.S. Appl. No. 09/642,192.
U.S. Office Action dated Nov. 20, 2006 issued in U.S. Appl. No. 09/642,192.
U.S. Office Action dated Jan. 20, 2010 issued in U.S. Appl. No. 11/731,406.
U.S. Final Office Action dated Jul. 2, 2010 issued in U.S. Appl. No. 11/731,406.
U.S. Office Action dated Jan. 19, 2011 issued in U.S. Appl. No. 11/731,406.
U.S. Office Action dated Jun. 14, 2011 issued in U.S. Appl. No. 11/731,406.
U.S. Final Office Action dated Jan. 24, 2012 issued in U.S. Appl. No. 11/731,406.
U.S. Office Action dated May 18, 2004 issued in U.S. Appl. No. 10/097,507.
U.S. Final Office Action dated May 17, 2005 issued in U.S. Appl. No. 10/097,507.
U.S. Notice of Allowance dated Aug. 31, 2005 issued in U.S. Appl. No. 10/097,507.
U.S. Office Action dated Dec. 24, 2009 issued in U.S. Appl. No. 11/285,898.
U.S. Final Office Action dated May 26, 2010 issued in U.S. Appl. No. 11/285,898.
U.S. Office Action dated Oct. 5, 2011 issued in U.S. Appl. No. 11/285,898.
U.S. Final Office Action dated Jan. 26, 2012 issued in U.S. Appl. No. 11/285,898.
U.S. Office Action dated Mar. 8, 2010 issued in U.S. Appl. No. 11/497,740.
U.S. Office Action Final dated Aug. 12, 2010 issued in U.S. Appl. No. 11/497,740.
U.S. Office Action dated Jul. 22, 2011 issued in U.S. Appl. No. 11/497,740.
U.S. Final Office Action dated Dec. 12, 2011 issued in U.S. Appl. No. 11/497,740.
U.S. Office Action dated Jan. 7, 2010 issued in U.S. Appl. No. 11/881,190.
U.S. Final Office Action dated Jun. 11, 2010 issued in U.S. Appl. No. 11/881,190.
U.S. Office Action dated Nov. 24, 2010 issued in U.S. Appl. No. 11/881,190.
U.S. Notice of Allowance dated Jun. 23, 2011 issued in U.S. Appl. No. 11/881,190.
U.S. Notice of Allowance dated Sep. 9, 2011 issued in U.S. Appl. No. 11/881,190.
U.S. Office Action dated Jan. 11, 2012 issued in U.S. Appl. No. 13/188,281.
Third Party Submission dated Jan. 17, 2012 for U.S. Appl. No. 13/188,281.
U.S. Office Action dated Apr. 4, 2006 issued in 1 U.S. Appl. No. 10/230,604.
U.S. Final Office Action dated Oct. 12, 2006 issued in U.S. Appl. No. 10/230,604.
U.S. Advisory Action dated Jan. 31, 2007 issued in U.S. Appl. No. 10/230,604.
U.S. Notice of Panel Decision from Pre-Appeal Brief Review dated Jun. 19, 2007 issued in U.S. Appl. No. 10/230,604.
U.S. Office Action dated Mar. 18, 2008 issued in U.S. Appl. No. 10/230,604.
U.S. Final Office Action dated Aug. 18, 2008 issued in U.S. Appl. No. 10/230,604.
U.S. Office Action dated May 13, 2008 issued in U.S. Appl. No. 11/173,442.

U.S. Final Office Action dated Nov. 4, 2008 issued in U.S. Appl. No. 11/173,442.
U.S. Office Action dated Apr. 30, 2009 issued in U.S. Appl. No. 11/173,442.
U.S. Final Office Action dated Dec. 21, 2009 issued in U.S. Appl. No. 11/173,442.
U.S. Office Action dated Jul. 7, 2010 issued in U.S. Appl. No. 11/173,442.
U.S. Office Action dated Dec. 8, 2010 issued in U.S. Appl. No. 11/173,442.
U.S. Notice of Allowance dated Apr. 14, 2011 issued in U.S. Appl. No. 11/173,442.
Third Party Submission dated Nov. 8, 2011 for U.S. Appl. No. 13/101,939.
U.S. Office Action dated Oct. 6, 2008 issued in U.S. Appl. No. 11/224,814.
U.S. Office Action dated Aug. 3, 2009 issued in U.S. Appl. No. 11/224,814.
U.S. Final Office Action dated Feb. 25, 2010 issued in U.S. Appl. No. 11/224,814.
U.S. Advisory Action dated May 18, 2010 issued in U.S. Appl. No. 11/224,814.
U.S. Notice of Allowance dated Oct. 7, 2010 issued in U.S. Appl. No. 11/224,814.
U.S. Response to 312 Amendment dated Nov. 26, 2010 issued in U.S. Appl. No. 11/224,814.
U.S. Office Action dated Nov. 25, 2011 issued in U.S. Appl. No. 12/253,525.
PCT International Preliminary Examination Report dated Oct. 25, 2002 issued in PCT/US01/17896.
PCT International Search Report dated Mar. 14, 2002 issued in PCT/US01/17896.
European Office Action dated Jan. 14, 2011 issued in EP 01 946 053.4-1238.
PCT International Preliminary Examination Report dated Jun. 27, 2003 issued in PCT/US01/25091.
PCT International Search Report dated Mar. 5, 2003 issued in PCT/US01/25091.
PCT International Written Opinion dated Mar. 31, 2003 issued in WO2002/01725 (PCT/US01/25091).
Australian Examiner's First Report dated Dec. 1, 2005 issued in AU2001283264.
Canadian Office Action dated Jul. 28, 2009 issued in CA 2,420,224.
Canadian Office Action dated Aug. 5, 2010 issued in CA 2,420,224.
Canadian Office Action dated Jun. 13, 2011 issued in CA 2,420,224.
European First Examination Report dated Feb. 10, 2009 issued in EP01962051.7.
Australian First Examination Report dated May 22, 2008 issued in AU2003200934.
Australian Examiner's First Report dated Jan. 31, 2011 issued in AU2009217419.
Canadian Office Action dated Jan. 21, 2011 issued in CA 2,421,541.
Canadian Office Action dated Jan. 31, 2012 issued in CA 2,421,541.
PCT International Search Report dated Nov. 13, 2003 issued in PCT/US2003/22180.
Australian Examiner's First Report dated Jun. 28, 2006 issued in AU2003251941.
Australian Examiner's Report No. 2 dated Aug. 8, 2006 issued in AU2003251941.
Australian Examiner's Report No. 3 dated Aug. 2, 2007 issued in AU2003251941.
Australian Examiner's First Report dated Aug. 7, 2009 issued in AU2008201281.
European Office Action dated Dec. 28, 2009 issued in EP03791582.4.
Russian Office Action (English translation) dated Apr. 10, 2007 issued in RU2005108664.
PCT International Search Report dated Apr. 7, 2008 issued in PCT/US2007/017121.
PCT Written Opinion dated Apr. 7, 2008, issued in PCT/US2007/017121.
PCT Partial International Search Report dated Jan. 25, 2008 issued in PCT/US2007/017121.
PCT International Preliminary Report on Patentability and Written Opinion dated Feb. 3, 2009 issued in PCT/US2007/017121 (WO2008/016610).
Australian Office Action dated Jul. 28, 2011 issued in 2007281499.
Australian Second Office Action dated Jan. 5, 2012 issued in 2007281499.
Chinese Office Action dated Jul. 31, 2009 issued in CN200780036010.9.
Chinese First Office Action dated Nov. 25, 2010 issued in CN200780036010.9.
Chinese Second Office Action dated Jun. 16, 2011 issued in CN200780036010.9.
Chinese Third Office Action dated Oct. 26, 2011 issued in CN200780036010.9.
PCT International Search Report dated Oct. 11, 2006 issued in WO2007/005290 (PCT/US2006/024129).
PCT International Preliminary Report on Patentability and Written Opinion dated Jan. 9, 2008 issued in WO2007/005290 (PCT/US2006/024129).
AU Examiner's First Report dated Oct. 22, 2010 issued in 2006266236.
AU Examiner's Second Report dated Sep. 19, 2011 issued in 2006266236.
European Communication dated Apr. 14, 2008 issued in EP 06 773 680.1.
European Summons to Attend Oral Proceedings Pursuant to Rule 115(1)EPC dated Nov. 27, 2008 issued in EP 06 773 680.1-2221.
European Consultation with Examiner dated Dec. 18, 2008 issued in EP 06 773 680.1.
European Office Action re Result of Consultation on Preliminary Examination of Application Prior to Oral Proceedings dated Sep. 24, 2009 issued in EP 06 773 680.1.
European Minutes of Oral Proceedings dated Jan. 8, 2010 issued in EP 06 773 680.1.
European Decision to Refuse European Patent Application dated Jan. 8, 2010 issued in EP 06 773 680.1.
European Communication of Proceedings Before the Board of Appeal dated Jun. 4, 2010 issued in EP 06 773 680.1.
PCT International Search Report dated Feb. 15, 2007 issued in WO/2007/032879 (PCT/US2006/033185).
PCT Written Opinion dated Feb. 15, 2007 issued in WO/2007/032879 (PCT/US2006/033185).
PCT International Preliminary Report on Patentability and Written Opinion dated Mar. 18, 2008 issued in PCT/US2006/033185.
Australian Examiner's first report dated May 27, 2011 issued in AU 2006291374.
Chinese First Office Action dated Sep. 25, 2009 issued in CN200680033246.2.
Chinese Second Office Action dated Sep. 10, 2010 issued in CN200680033246.2.
European Examination Report dated Jun. 2, 2008 issued in EP 06 813 743.9.
European Summons to Attend Oral Proceedings Pursuant to Rule 115(1)EPC dated Nov. 21, 2008 issued in EP06813743.9.
European Result of Consultation and Brief Communication dated Apr. 28, 2009 issued in EP06813743.9.
PCT International Preliminary Report on Patentability and Written Opinion dated Mar. 18, 2008 issued in PCT/US2006/033429.
PCT International Search Report dated May 7, 2010 issued in PCT/US2009/058664.
PCT International Preliminary Report on Patentability and Written Opinion dated Apr. 19, 2011 issued in PCT/US2009/058664.
"1,001 Windows 95 Tips, Operating System Shortcuts" (1995) Synapse Adaptive.com, Access and Productivity Tools, webpage retrieved from the Internet at http://www.synapseadaptive.com/tools/Win95%20keyboard%20shortcuts.html, on Dec. 8, 2009, 3 pages.
Adamec, Justene, (Sep. 9, 2005) "Checkraise: The Bots", Blogcritics.org News, [downloaded from http://blogcritics.org/archives/2005/09/09/093200.php on Jun. 30, 2006], 3 pages.
CS Guard, Dec. 19, 2001, Half-Life www.olo.counter.com, webpage retrieved from the Internet at http://www.olo.counter-strike.pl/index.php?page=archive on Jun. 3, 2010, p. 3 of 5 pages.

Gaming Standards Association (2007), "G2S Basics," webpage retrieved from Internet at http://www.gamingstandards.com/pdfs/G2S_Sheet_final.pdf, on Sep. 5, 2008, 2 pages.

Gaming Standards Association (2007) (author unknown), "S2S Message Protocol v1.2 with Errata Sheet 1," Chapter 13, pp. 289-308. [online] retrieved from Internet on Sep. 23, 2008. http://www.gamingstandards.com/index.php?page=standards/free_downloads-standards.

Golle, Philippe et al., "Preventing Bots from Playing Online Games" ACM Computers in Entertainment, [Online] vol. 3, No. 3, Jul. 2005, pp. 1-10, XP002465544 Retrieved from the Internet: http://portal.acm.org/citation.cfm?doid=1077246.1077255.

Hauptmann, Steffen et al. (1996) "On-line Maintenance With On-The-Fly-Software Replacement," 1996 IEEE Proceedings, Third International Conference on Configurable Distributed Systems, No. 0-8 186-7395-8/96, 11 pgs (70-80).

HBP-10 Bill Dispenser, Multi-Country Platform (2001) JCM American, retrieved from the Internet at http://www.jcm-american.com/bill_dispensers.html on Sep. 20, 2001, 1 page.

HBP-5 Note Hopper (2001) JCM American, retrieved from the Internet at http://www.jcm-american.com/sub-note-hoppers.html on Sep. 20, 2001, 1 page.

Hiroaki Higaki, 8 page document entitled "Group Communication Algorithm for Dynamically Updating in Distributed Systems" Copyright 1994 IEEE International Conference on Parallel and Distributed Systems (pp. 56-62) 08-8 186-655-6/94, higaki@sdesun.slab.ntt.jp.

Hiroaki Higaki, 9 page document entitled "Extended Group Communication Algorithm for Updating Distributed Programs" Copyright 1996, IEEE, International Conference on Parallel and Distributed Systems, 0-81 86-7267-6/96, hig@takilab.k.dendai.as.jp.

"Noble Poker: Security & Integrity" (2005) advertisement from NoblePoker.com retrieved from the Internet at http://web.archive.org/web/20050512081751/http://www.noblepoker.com on May 12, 2005, XP-002465543, 2 pages.

Oracle8™ Enterprise Edition Partitioning Option (1999), Features Overview Feb. 1999, webpage for Oracle Corporation, retrieved from the Internet at www.oracle.com/collateral/ent_partitioning_fo_pdf, Feb. 1999, 8 pgs.

PcToolsTM Guides, "Manage the CPU Task Priority," www.pctools.com, webpage retrieved from the Internet at http://www.pctools.com/guides/registry/detail.1179, Sep. 16, 2002, 2 pgs.

Spielo Gaming International (2000) webpage advertisements entitled "Visions of Tomorrow" and "PowerStation5" retrieved from the Internet at http://www.spielo.com, dated Dec. 6, 2000, 7 pages.

Webster's 1913 Dictionary, Definition of "Continuous" as shown in Webster's Online Dictionary, retrieved from the Internet at http://www.webster-dictionary.org/definition/continuous on Mar. 2, 2009, 2 pgs.

Webster's 1913 Dictionary, Definition of "Regular" as shown in Webster's Online Dictionary, retrieved from the Internet at http://www.webster-dictionary.org/definition/regular on Mar. 2, 2009, 3 pgs.

Windows 3.1 Resource Kit, Jul. 30, 2001, Microsoft.com, retrieved from the Internet at http://support.microsoft.com/kb/83433 on Feb. 8, 2009 and on Aug. 27, 2010.

* cited by examiner

DISTRIBUTED GAME SERVICES

CROSS-REFERENCE TO RELATED APPLICATION

This application relates to commonly assigned, copending U.S. patent application Ser. No. 11/224,814, filed concurrently herewith, for METHOD AND SYSTEM FOR INSTANT-ON GAME DOWNLOAD, which is hereby incorporated by reference.

BACKGROUND OF THE INVENTION

The present disclosure relates to gaming machines and networks and, more particularly, to games-on-demand systems.

Gaming in the United States is divided into Class I, Class II and Class III games. Class I gaming includes social games played for minimal prizes, or traditional ceremonial games. Class II gaming includes bingo games, pull tab games if played in the same location as bingo games, lotto, punch boards, tip jars, instant bingo, and other games similar to bingo. Class III gaming includes any game that is not a Class I or Class II game, such as a game of chance typically offered in non-Indian, state-regulated casinos. Many games of chance that are played on gaming machines fall into the Class II and Class III categories of games.

Various games, particularly the Class II and Class III categories of games, can be implemented as server-based games in a server-client system. Server-based games are generally those in which the games and capabilities of a gaming terminal depend on a central server. The terminal may download games from the central server or may rely on the central server to run the games.

Game applications are becoming more sophisticated and, hence, larger in size, to use the expanding capabilities of central servers and gaming terminals. In addition, the number of different game applications available for play is always increasing, as game developers attempt to keep players interested in visiting casinos to play new and exciting games. As a result, there are so many various game applications in existence; it has become impractical to store all of these games on a single gaming terminal. Thus, server-based games have been implemented in many casinos and hotels. In this way, a multitude of game applications can be stored at a central server, and played remotely or downloaded to individual gaming terminals in the gaming network.

In a games-on-demand system, a player can operate a gaming terminal to request a particular game for playing. In a server-client game download configuration, a requested game is downloaded from the central server to the gaming terminal, and then executed on the gaming terminal. In a server-based configuration, on the other hand, the requested game is executed on the server, and the player interacts with the server to play the game. For example, U.S. Pat. No. 5,779,549, "Database Driven Online Distributed Tournament System," U.S. Pat. No. 6,001,016, "Remote Gaming Device," and U.S. Pat. No. 6,409,602, "Slim Terminal Gaming System" describe server-based configurations where minimal or no processing occurs on the gaming machine. In these conventional systems, the game is executed on the central server, and outcome data are sent to the gaming machine for output to the player. The gaming machine operates as an 10 device for a player to interact remotely with the game executed on the central server. The game play, meter tracking, and other game functions are carried out on the central server.

In implementing a games-on-demand system, both the download configuration and the server-based configuration described above have their respective drawbacks. In a download configuration, the gaming terminal is susceptible to long delays while a requested game is retrieved and downloaded from the central server, and then authenticated, before game play can begin. These delays are often attributable to the large and ever increasing size of game applications, as explained above. In addition, downloading of games on-demand is bandwidth intensive, computationally complex and intensive, and not secure when games are in transit. In a server-based configuration, a drawback is that the operability of the gaming terminals is entirely network-dependent. When the central server malfunctions, or other network problems arise, interfering with the connection between the gaming terminals and the central server, all of the gaming terminals are affected. Game play can be hindered on the gaming terminals due to their dependence on the central server to execute the game.

Thus, it is desirable to provide a gaming system which eliminates both the delay and other problems associated with download configurations, and the network-dependence associated with server-based configurations.

SUMMARY OF THE INVENTION

Disclosed are methods, apparatus, and systems, including computer program products, implementing and using techniques for providing a game of chance.

In one aspect of the present invention, at a local gaming machine in communication with a remote gaming machine over a data network, a player input is received at an input terminal. The player input requests a game application. A location of the requested game application is determined as being at the remote gaming machine. Interface requirements of the requested game application are identified. It is determined whether the identified interface requirements are compatible with the interface of the local gaming machine. It is also determined whether the requested game application is available for execution on the remote gaming machine. When it is determined that the interface requirements are compatible and that the requested game application is available for execution, an instance of the requested game application is reserved on the remote gaming machine.

In one implementation, responsive to execution of the instance of the requested game application on the remote gaming machine, output data of the executed game application is received from the remote gaming machine over the data network. This received output data can be stored in memory and/or can be provided on an interface of the local gaming machine. Generic output data components can be received from a storage medium and provided on the interface. One or more game parameters can be captured from the received output data. In some implementations, determining whether the requested game application is available for execution on the remote gaming machine includes determining compliance of the requested game application with interface requirements, licensing requirements and/or jurisdictional requirements.

According to another aspect to the present invention, at a remote gaming machine, a game of chance is provided to a local gaming machine in communication with the remote gaming machine over a data network. A game application request message is received from the local gaming machine over the data network. The request message requests a game application. Interface requirements of the requested game application are provided. It is determined whether the requested game application is available for execution on the remote gaming machine. An instance of the requested game application is reserved on the remote gaming machine when it is determined that the requested game application is available for execution.

In some implementations, the instance of the requested game application is executed on the processor of the remote gaming machine. Output data of the executing game application is sent from the remote gaming machine to the local gaming machine over the data network. Authentication information can be provided in frames of the output data, for instance, as a digital signature embedded in the frame.

According to another aspect of the present invention, a local gaming machine provides a game of chance from a remote gaming machine in communication with the local gaming machine over a data network. The gaming machine includes a user interface coupled to receive a player input. The player input requests a game application. A gaming controller including a processor is configured to: (1) determine a location of the requested game application as being at the remote gaming machine, (2) identify interface requirements of the requested game application, (3) determine whether the identified interface requirements are compatible with an interface of the local gaming machine, (4) determine whether the requested game application is available for execution on the remote gaming machine, and (5) reserve an instance of the requested game application on the remote gaming machine when it is determined that the interface requirements are compatible and that the requested game application is available for execution.

According to another aspect of the present invention, a remote gaming machine provides a game of chance to a local gaming machine in communication with the remote gaming machine over a data network. The remote gaming machine includes a communications interface coupled to receive a game application request message from the local gaming machine over the data network. The request message requests a game application. A gaming controller including a processor is configured to: (1) provide interface requirements of the requested game application, (2) determine whether the requested game application is available for execution on the remote gaming machine, (3) reserve an instance of the requested game application on the remote gaming machine when it is determined that the requested game application is available for execution, and (5) execute the instance of the requested game application. The remote gaming machine further includes a streaming module coupled to send output data of the executing game application from the remote gaming machine to the local gaming machine over the data network.

All of the foregoing methods, along with other methods of aspects of the present invention, may be implemented in software, firmware, hardware and combinations thereof. For example, the methods of aspects of the present invention may be implemented by computer programs embodied in machine-readable media and other products.

Aspects of the invention may be implemented by networked gaming machines, game servers and other such devices. These and other features and benefits of aspects of the invention will be described in more detail below with reference to the associated drawings.

DETAILED DESCRIPTION OF THE EMBODIMENTS

Figure 1:
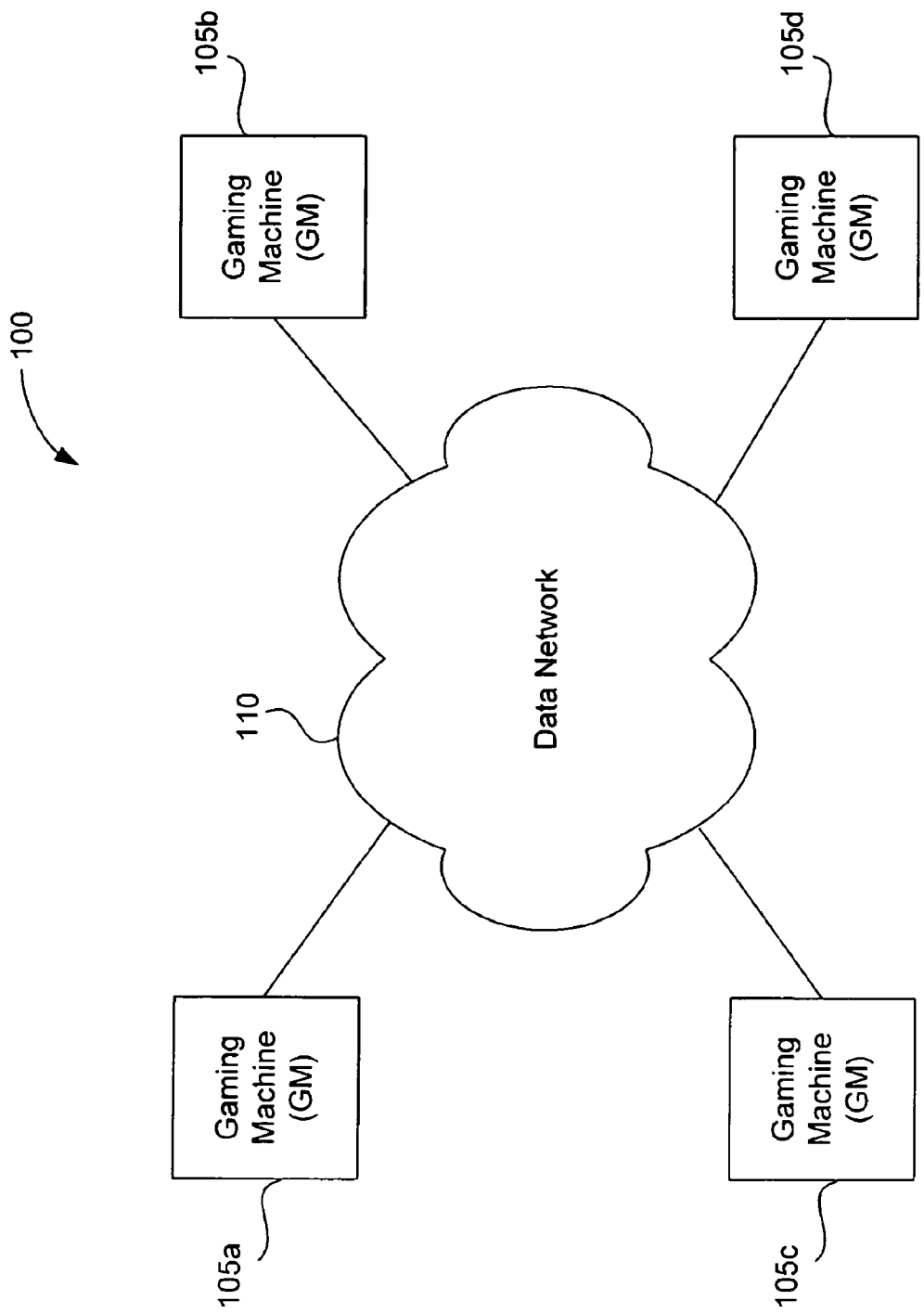
FIG. 1 shows a block diagram of a peer-to-peer gaming system 100 for providing remote gaming, constructed according to one embodiment of the present invention.

Reference will now be made in detail to some specific embodiments of the invention including the best modes contemplated by the inventors for carrying out the invention.

Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

Implementations of the present invention provide games-on-demand methods, apparatus, and systems for playing games of chance in a peer-to-peer gaming machine configuration. Game application executables, also referred to herein as games and game codes, are stored redundantly among the gaming machines to define a distributed game network. Gaming machines can be implemented in various forms, including the gaming machines shown and described with reference to FIGS. 16 and 17. In other mobile gaming implementations, part of the gaming machine functions are implemented in a portable handheld device such as a personal digital assistant ("PDA") or a cell phone. Other implementations of the gaming machine functionality include data processing devices such a a personal computer ("PC") or an interactive television enabled device.

When a player situated at one of the gaming machines requests a game not stored locally, the game can be executed remotely at one of the other gaming machines in the peer-to-peer network. As will be appreciated by those skilled in the art, an executable game application generally operates on a set of input data to produce output data. Output data of the executing game application, for example, video and audio streams, are routed to the local gaming machine where the player is situated. The player can then interact with the remote gaming machine for remote game play. The effect of instant-on game play is achieved at any of the gaming machines where a player wishes to play games.

Applying principles of the present invention, the delay associated with game download is eliminated because the entire game executable does not have be downloaded, unpacked, decrypted and then authenticated. Instead, the game application is executed at the origin, in its native mode, and the results piped to the requesting gaming machine. Computational resources are conserved. Security is improved, in that it is difficult for a hacker to intercept frames of the streamed output data from one of the remote gaming machines, alter the data frame-by-frame, and provide the output data to the local gaming machine without noticeable delay. Redundant storage substantially reduces or eliminates the problem of network errors, as the game can be executed on another remote gaming machine with which the local gaming machine has established communications. The need for a central server is minimized or eliminated, as the games and other relevant data are distributed among the various gaming machines in the peer-to-peer network. Reliability increases as a point of possible failure (the central server) is eliminated.

FIG. 1 shows a gaming system 100 constructed according to one embodiment of the present invention. In FIG. 1, system 100 includes gaming machines 105a, 105b, 105c and 105d in communication with one another over a suitable data network 110. In gaming system 100, the gaming machines 105a-105d are configured in a peer-to-peer network arrangement. Peer-to-peer gaming machine networks are described in commonly assigned and co-pending U.S. patent application Ser. No. 09/595,798, entitled "Using a Gaming Machine as a Server," filed Jun. 16, 2000, and U.S. patent application Ser. No. 11/078,966, entitled "Secured Virtual Network in a Gaming Environment," filed Mar. 10, 2005, both of which are hereby incorporated by reference. In such peer-to-peer arrangements, including gaming system 100, each gaming machine can send and receive data to and from other gaming machines in system 100. Thus, in contrast with central determination and other server-based arrangements, gaming system 100 does not require a central server to serve the various gaming machines 105a-105d in the system 100.

In FIG. 1, data network 110 can be implemented as desired, for instance, as a local area network "LAN", a wide area network "WAN" such as the Internet, and various combinations thereof. Other suitable communications networks can be used to define data network 110 within the spirit and scope of the invention, including the data networks described below with respect to FIGS. 16-18. Exemplary gaming machines 105a-105d are constructed using combinations of hardware and software, described below with respect to FIGS. 16-18.

Figure 2:
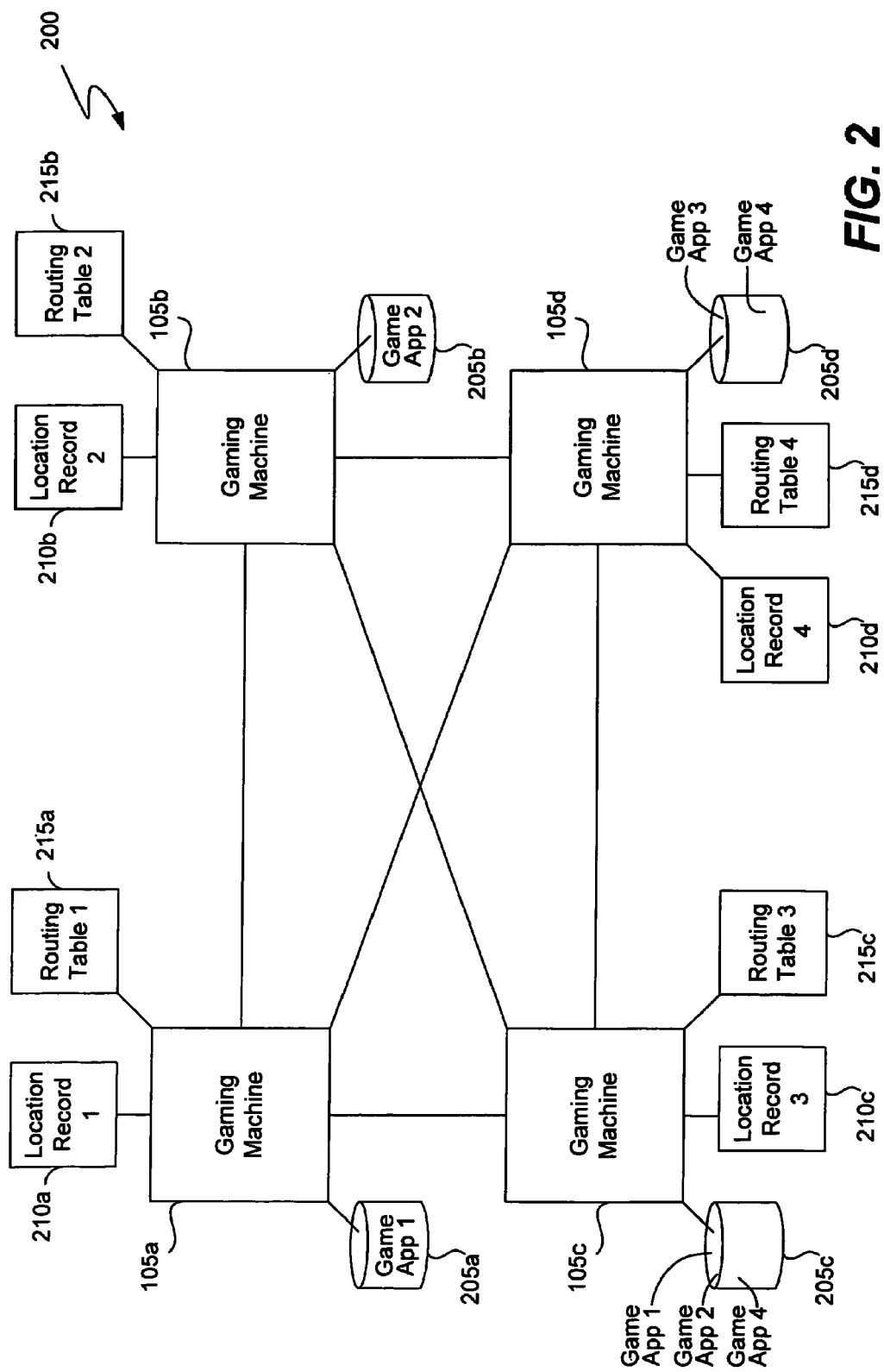
FIG. 2 shows a block diagram of a peer-to-peer gaming system 200 for providing remote gaming, constructed according to one embodiment of the present invention.

FIG. 2 shows a peer-to-peer gaming system 200 constructed according to another embodiment of the present invention. In system 200, gaming machines 105a-105d are in communication with one another over data network 110 in a peer-to-peer arrangement, as described above with respect to FIG. 1. In addition, in FIG. 2, each gaming machine 105a-105d has a respective storage medium 205a-205d coupled as shown in FIG. 2. Each storage medium can be implemented in various ways, as will be understood by those skilled in the art. In one implementation, storage medium 205a is implemented as a database situated external to gaming machine 105a and in communication with gaming machine 105a over a suitable communications link. In another implementation, storage medium 205a is implemented as a memory device situated within gaming machine 105a. These and other implementations are intended to be within the spirit and scope of the present invention.

Implementations of gaming methods and systems described herein provide efficient and enjoyable game play for players of the games. In addition to the features described herein, games are executed and played with implementations of the present invention in accordance with techniques described in commonly assigned and co-pending U.S. patent application Ser. No. 10/931,673, entitled "Multi-Player Bingo Game with Real-Time Game-Winning Pattern Determination," filed Sep. 1, 2004.

In FIG. 2, each storage medium 205a-205d can store one or more game applications to be retrieved and executed. In one implementation, as shown in system 200, there are four game applications available in the gaming system 200, designated "Game App 1," "Game App 2," "Game App 3," and "Game App 4." For example, Game App 1 is blackjack, Game App 2 is Poker, and Game Apps 3 and 4 are other games of chance. Using the novel distribution techniques described herein, or other techniques such as BitTorrent, a software program available from BitTorrent, Inc. of Bellevue, Wash., one or more copies of a particular game application are distributed among gaming machines 105a-105d in system 200. For instance, in system 200, a copy of Game App 1 is stored in storage medium 205a, and a further copy of the same Game App 1 is stored in storage medium 205c at gaming machine 105c. As shown, Game App 2 is stored in both storage mediums 205b and 205c. Game App 3 is stored in storage medium 205d, and copies of Game App 4 are stored in storage mediums 205c and 205d. The purpose and use of the multiple copies of the same game application is described herein.

Generally, providing multiple copies of a particular game application enables the execution of multiple instances of that game application throughout the system 200. Multiple instances of game applications at a single machine, and multiple instances of game applications at multiple machines, can be played.

In FIG. 2, in one embodiment, each gaming machine 105a-105d has a respective location record 210a-210d. Each location record 210a-210d generally shows the location of the various copies of the game applications throughout system 200. Each location record 210a-210d can include additional information regarding the status of the various game applications, and can be updated using several techniques, depending on the desired implementation. For example, in one implementation, location records are updated by performing a network "crawl" operation similar to the processing of Internet search engines such as Google™. That is, periodically, the gaming machines in system 200 are queried to identify which game applications are situated at those machines and, in some embodiments, how many instances of those applications can be executed simultaneously at each machine. In another embodiment, each gaming machine 105a-105d broadcasts messages to the other machines in the system 200 indicating the game applications situated at that machine and, in some implementations, a number of available instances of those applications. Embodiments of the location records 210a-210d and usage of those records 210a-210d are further described below.

In FIG. 2, each gaming machine also includes a respective routing table 215a-215d. Each routing table is used by the respective gaming machine to locate other gaming machines in the peer-to-peer system 200. In one embodiment, the routing table provides a listing of a sequence of the gaming machines, defining an order in which the listed machines are to be accessed by the gaming machine associated with the routing table. In one embodiment, the routing table is defined according to the network distance from the gaming machine associated with the routing table to the other gaming machines in the network. As described herein, the routing table can be used independently or in conjunction with a location record to locate game applications at various gaming machines in system 200. Routing tables 215a-215d can be implemented in several ways, as described herein. The information included in a routing table, and the usage of the routing table is described in greater detail below.

As will be appreciated by those skilled in the art, location records 210a-210d, and routing tables 215a-215d can be stored in various memory devices in system 200. In one implementation, each pair of location record and routing table is stored in memory within the respective gaming machine. In other implementation, each location record and routing table pair is stored in a storage medium situated external to the gaming machine, such as storage medium 205a. In this implementation, different banks of memory addresses are preferably used to distinguish the location records, routing tables and game applications. In another implementation, the location records and routing tables can be stored at a central data repository coupled as part of system 200, for instance, at a central server. Other implementations are intended to be within the spirit and the scope of the present invention.

Figure 3:
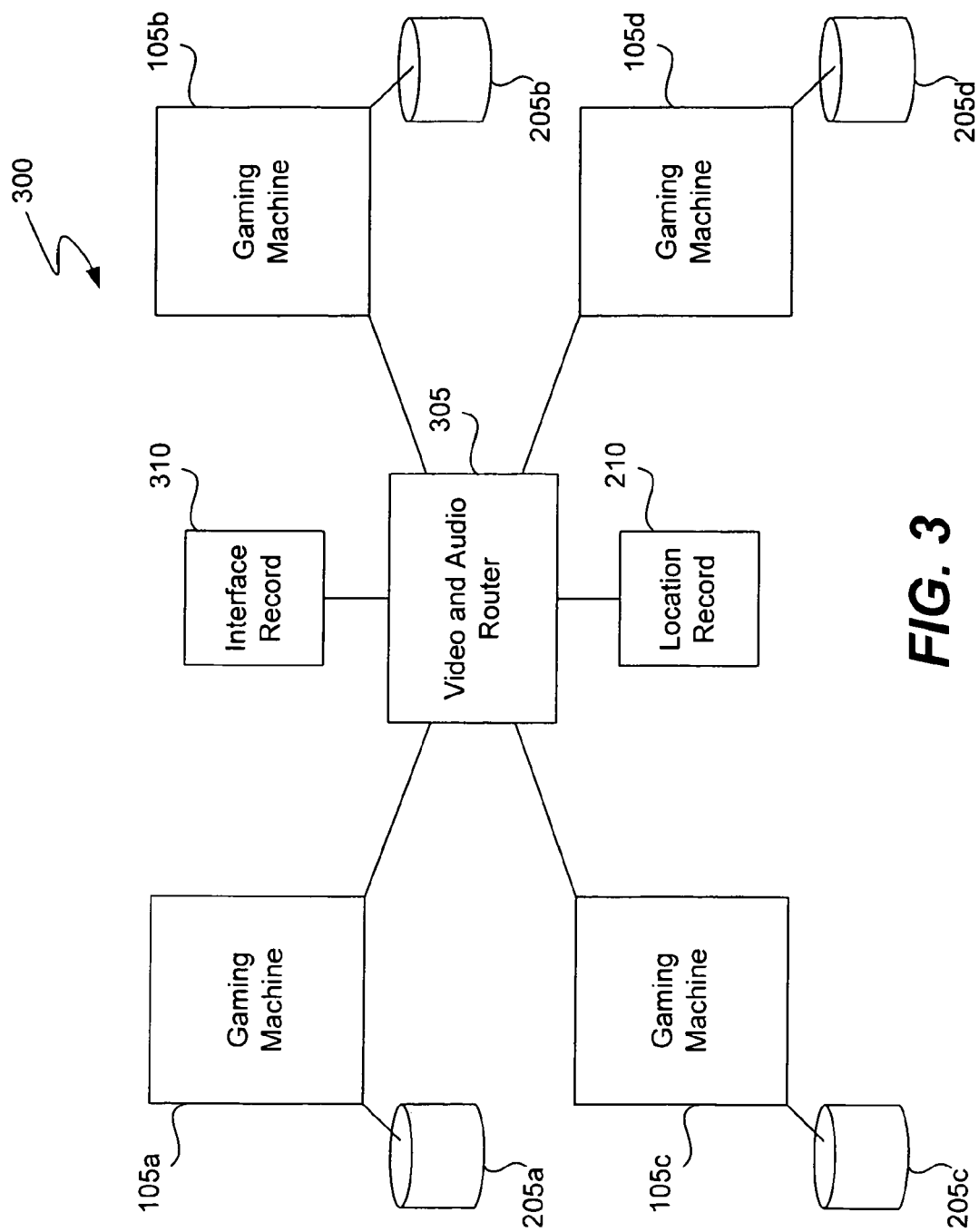
FIG. 3 shows a block diagram of a peer-to-peer gaming system 300 for providing remote gaming, constructed according to one embodiment of the present invention.

FIG. 3 shows a gaming system 300 constructed according to another embodiment of the present invention. In FIG. 3, a video and audio router 305 is interposed between the various gaming machines 105a-105d in the system. The video and audio router 305 can be implemented with various combinations of software and hardware, as will be appreciated by the skilled artisan. Generally, the video and audio router 305 handles the routing of output data, including video and audio content, between gaming machines 105a-105d in the system 300. That is, when it is determined that one of the gaming machines 105a-105d is to deliver such multimedia data to another one of the gaming machines 105a-105d, the sending or remote gaming machine can stream rendered output audio or video data to the video and audio router 305 for delivery to the requesting or local gaming machine. Such video and audio content can be stored in any suitable storage medium, including storage mediums 205a-205d with other data described above with respect to FIG. 2.

In FIG. 3, in the system 300, rather than provide a particular location record at each gaming machine 105a-105d, a single location record 210 is stored at a suitable storage medium coupled to video and audio router 305, or at another suitable storage medium in such a central location. In this embodiment, location record 210 serves as a "master" location record, containing all of the information of location records 210a-210d of system 200. Thus, each gaming machine 105a-105d accesses the single location record 210 to determine the location of game applications and possibly other information regarding those game applications in system 300.

In FIG. 3, system 300 further includes an interface record 310 also stored, in this embodiment, at a central location such as video and audio router 305. In one embodiment, the interface record 310 defines interface requirements of the particular gaming machines 105a-105d, as well as interface requirements of particular game applications distributed throughout system 300. Examples of interface elements for a gaming machine include hardware of the gaming machine and the software for interacting with and processing output data of the executing game application. Interface elements are described herein, particularly with respect to FIGS. 16-18 below. For example, hardware interface requirements can include resolution and other essentials of a display monitor, lights for required visual effects, audio processing and output needs, information panels, a designation of input devices for interacting with the game such as buttons and switches, and internal hardware requirements such as CPU speed, memory storage capacity, and other specifications. The requirements of these interface elements for a game, as well as the capabilities of a particular gaming machine, can be provided in the interface record. In this way, as described in greater detail below, the interface record can be used to check the compatibility of game applications with gaming machines to ensure that interface requirements are consistent.

In FIG. 3, video and audio router 305, location record 210 and interface record 310 can be implemented in various configurations. In one implementation, the video and audio router 305 is implemented as part of a central server in the gaming system 300. In another embodiment, the video and audio router 305 is a separate stand-alone device coupled in data network 110 in a suitable manner such that the gaming machines 105a-105d can send output data to one another through video and audio router 305. In one implementation, the central server in which video and audio router 305 is implemented also provides for the sending of communications such as request messages and control data between gaming machines in the system 300.

Figure 4:
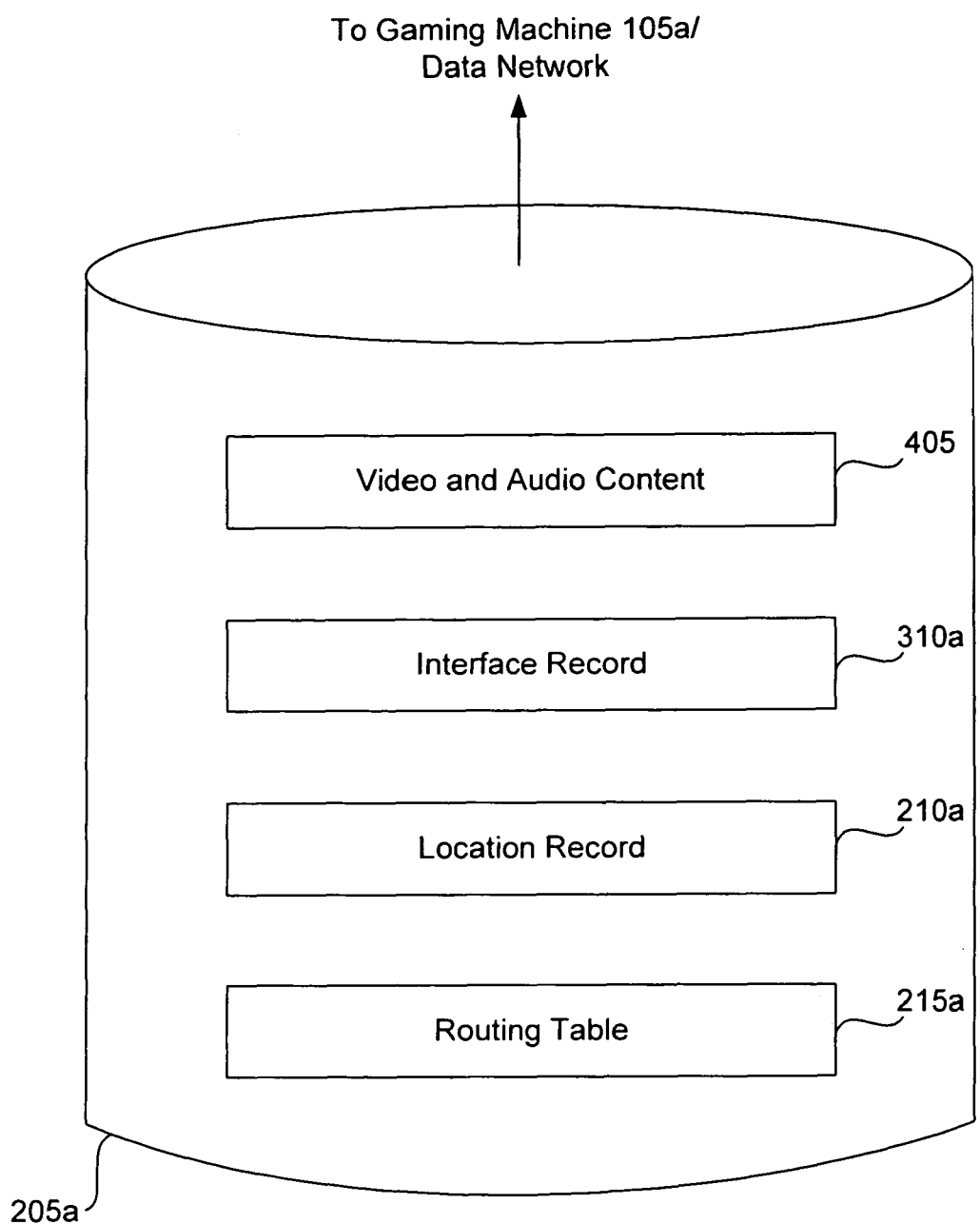
FIG. 4 shows a diagram of a storage medium in a peer-to-peer gaming system 300 for providing remote gaming, constructed according to one embodiment of the present invention.

FIG. 4 shows a storage medium 205a of FIG. 2, constructed according to one embodiment of the present invention. In this embodiment, each storage medium 205a-205d contains respective records and other information for use by the associated gaming machine. For instance, in FIG. 4, storage medium 205a, in communication with gaming machine 105a, includes video and audio content components used by game applications situated locally at gaming machine 105a, such as Game App 1. In this embodiment, storage medium 205*a* further includes an interface record 310*a*, which defines interface requirements of gaming machine 105*a* and requirements of game applications stored at gaming machine 105*a*, such as Game App 1. In addition, storage medium 205*a*, in this embodiment, includes location record 210*a*, described herein, and routing table 215*a*, also described herein. In FIG. 4, those skilled in the art will appreciate that the storage of the various data in storage medium 205*a*, as shown in FIG. 4, is but only one implementation for storage of such information in gaming systems constructed according to embodiments of the present invention. Such data can be stored in other memory devices and other locations in the gaming systems.

Figure 5:
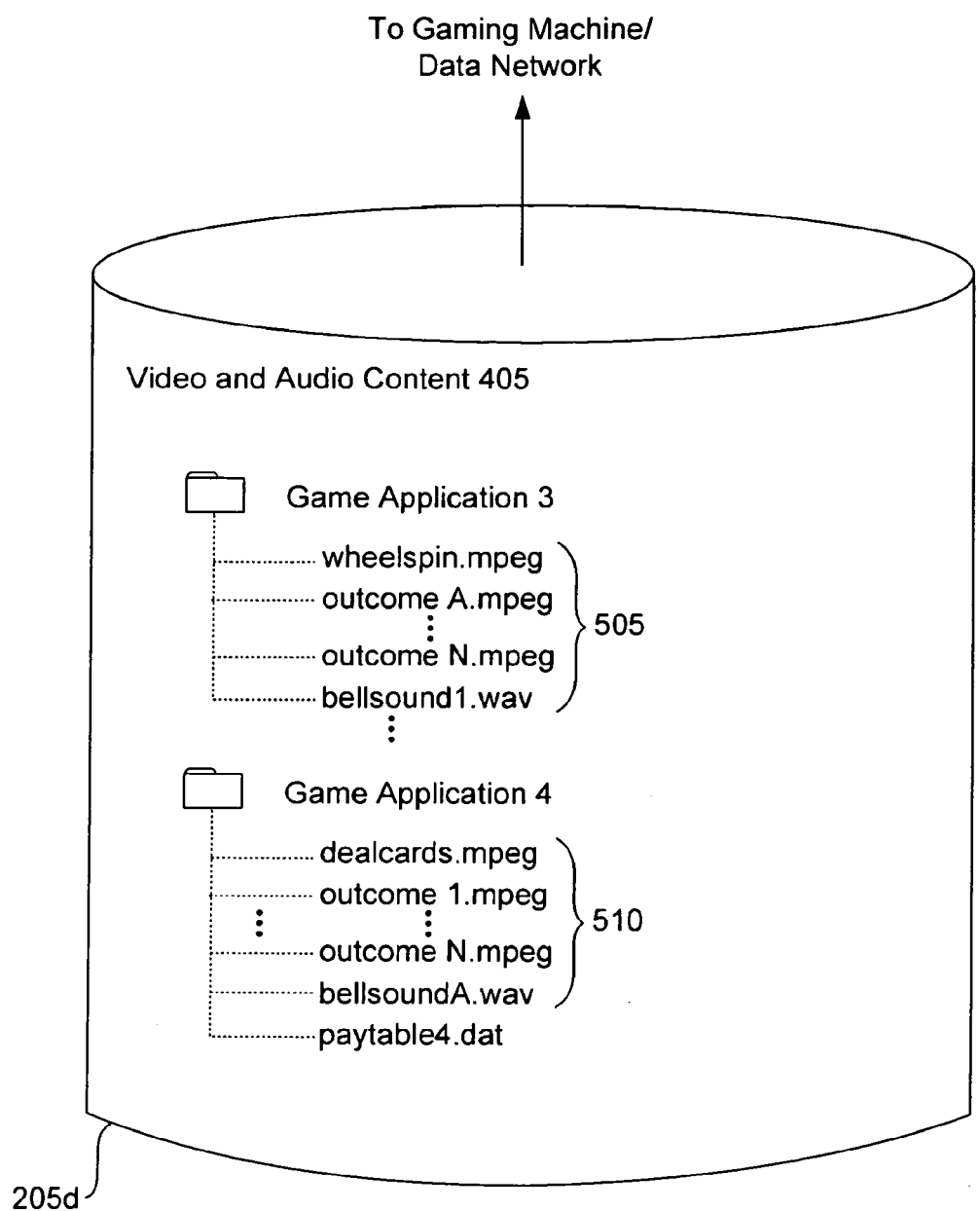
FIG. 5 shows a diagram of a storage medium in a peer-to-peer gaming system having video and audio content, arranged according one embodiment of the present invention.

FIG. 5 shows the video and audio content 405 within storage medium 205*d*, arranged according to one embodiment of the present invention. In storage medium 205*d*, output data 505 associated with Game App 3 is stored in files within a directory structure, as shown. Similarly, output data 510 is stored and associated with Game App 4. The output data 505 and 510 include multimedia components, including video and audio components as shown. In one embodiment, the video components include MPEG (".mpeg") files, preferably in the MPEG4 format. Also, the output data 505 and 510 include audio .wav files, as shown. Additional data can be stored and associated with any of the game applications, including a paytable ("paytable4.dat") for Game App 4. The paytable4.dat file is a data resource defining one or more pay tables for Game App 4. In FIG. 5, while the multimedia components 505 and 510 of output data are shown as arranged in a directory structure, those skilled in the art should appreciate that other arrangements of such output data are contemplated within the spirit and scope of the present invention.

In FIG. 5, one benefit of the storage and the arrangement of video content for each respective game application is that the same data resources can be used when multiple instances of the particular game application are executed. That is, some of the same .mpeg video files, .wav audio files and other data files can be retrieved and used by more than one instance of the executing game application. This re-use of information minimizes the storage requirements that would otherwise be necessary for executing multiple instances of the same game application.

In FIG. 5, in one embodiment, as shown, the video and audio content files 505 and 510 are pre-rendered; that is, the outcome presentation is generated before the game is requested. In this way, the file can be quickly retrieved and played on a suitable multimedia player provided in the gaming machine. The output data can be streamed to a requesting gaming machine in the system over data network 110 for output on a user interface, such as a monitor or speaker, of the requesting gaming machine. Because the same video and audio content files 505 and 510 are used for multiple instances of the game applications, the same bitmap of an outcome, for example, can be retrieved and output in multiple sets of streamed data, all originating from the single storage medium 205*d*. In some embodiments, choices for pre-rendered outcomes are purposely limited so that player selection of wager amounts, paylines, etc. can be matched to available pre-rendered outcomes. In other embodiments, outcomes are generated on-demand, particularly in jurisdictions prohibiting the use of pre-rendered outcomes.

In FIG. 1, any one of the gaming machines 105*a*-105*d* can request the execution of the game application situated on any of the other gaming machines 105*a*-105*d* in the system 100. When a gaming machine 105*a* makes such a request, that gaming machine is referred to herein as a "local" gaming machine. The local gaming machine is the gaming machine with which the player interacts to play a game application situated on that local gaming machine or situated on a different one of the gaming machines 105*b*-105*d*. A gaming machine on which the game application is executed, but not at which the player is located, is referred to herein as a "remote" gaming machine. Because the systems described herein are hybrids of peer-to-peer systems, in one embodiment, each gaming machine 105*a*-105*d* in the system includes suitable apparatus and methods for serving as both a local gaming machine and a remote gaming machine. In another embodiment, one or more gaming machines in the network are strictly local gaming machines, while others are strictly remote. For example, one or more local gaming machines can be situated on a casino floor or otherwise accessible to a player, while a remote gaming machine or server providing the functions of a remote gaming machine is situated in a back room or other location not accessible to players.

Figure 6:
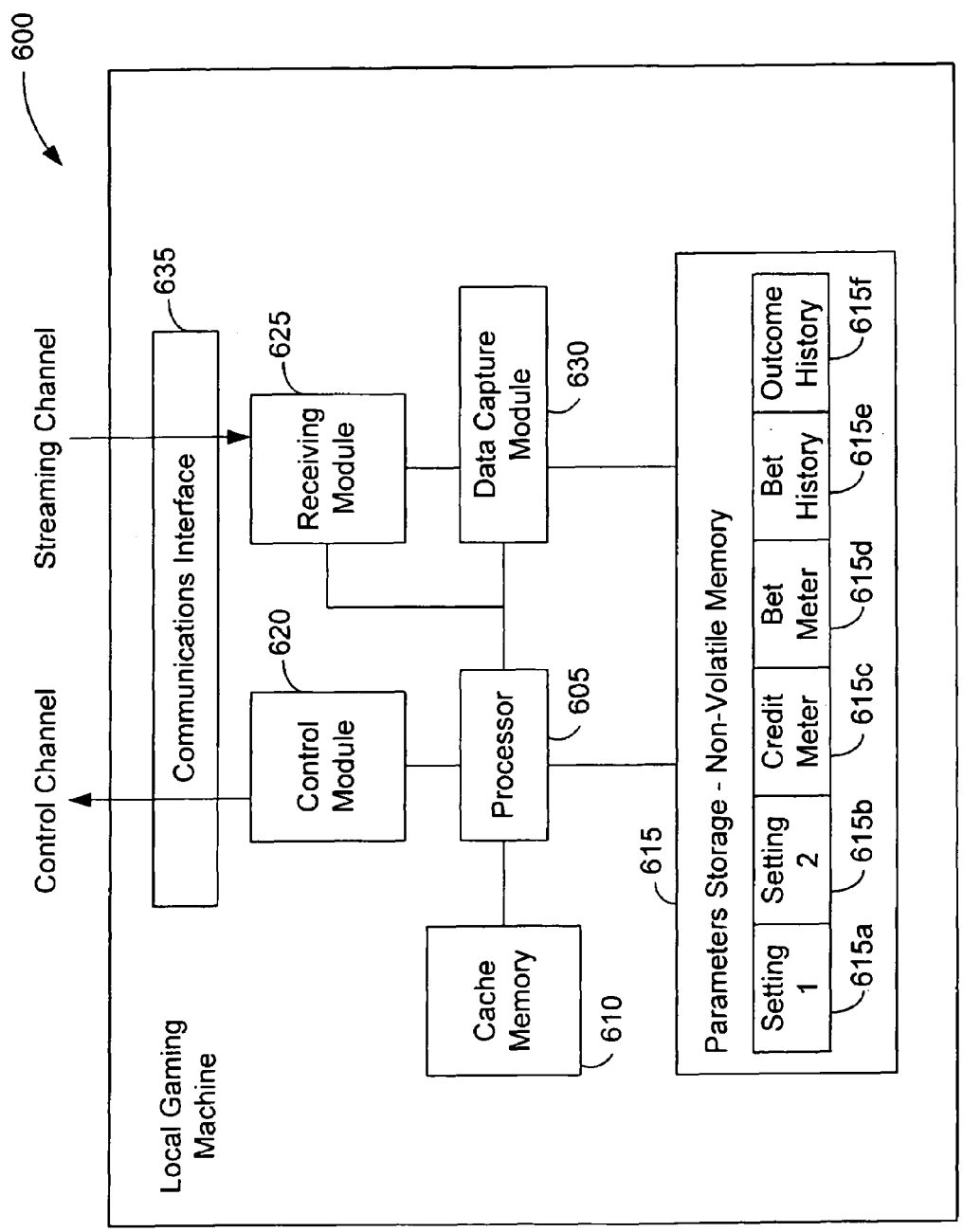
FIG. 6 shows a block diagram of a local gaming machine apparatus, constructed according to one embodiment of the present invention.

In FIG. 6, the apparatus 600 of a local gaming machine is shown. The local gaming machine 600 includes a processor 605 which can be implemented as part of a master gaming controller, described below. This processor 605 executes certain code using various data, including data stored in a cache memory 610 and parameters stored in a nonvolatile memory 615. In one implementation, cache memory 610 and nonvolatile memory 615 are parts of a single memory device. In another embodiment, the cache memory 610 is separate from nonvolatile memory 615, as shown in FIG. 6.

In FIG. 6, a control module sends control data to the remote gaming machine on which the game application is played so that the player of local gaming machine 600 can interact with the game application executing on the remote gaming machine. Therefore, control module 620 is coupled to a player interface of the gaming machine with a suitable input terminal or other controls to receive player input for playing the game, as described below. In one embodiment, as shown, player input, also referred to herein as interaction data, is sent to the remote gaming machine over a control channel of data network 110.

In FIG. 6, a receiving module 625 receives the streamed output data from the remote gaming machine on which the requested game application is being executed. In one embodiment, receiving module 625 includes an MPEG4 decoder to decode the streamed MPEG files from the streaming channel of data network 110. A data capture module 630 is provided to receive the decoded data from receiving module 625 and perform screen or frame captures, in some implementations, to gather parameters from the received output data for storage in nonvolatile memory 615.

As shown in FIG. 6, memory 615 includes several banks 615*a*-615*f* in which the respective parameters are stored. In one implementation, these parameters include credit meter 615*c*, bit meter 615*d*, bit history 615*e*, outcome history 615*f* and other settings 615*a* and 615*b* for the particular game to be played.

One benefit of storing the parameters of the game application at the local gaming machine, even though the game application is being executed on another remote gaming machine, is to provide an audit trail for the game that can be accessed at the particular local gaming machine on which the player plays the game. In one embodiment, these same parameters 615*a-f* are also stored at the remote gaming machine on which the game application is being executed. Those skilled in the art will appreciate that additional blocks of memory in nonvolatile memory 615 can be allocated to maintain settings and other parameters for various players and for various game applications.

In another embodiment, the parameters in memory 615 are stored at a central server in addition to or as an alternative to the storage of parameters at the remote gaming machine. In one implementation, this central server has a verification check mode that can be invoked as desired, for instance, for jackpots exceeding a certain amount. In the various parameter storage schemes described herein, the parameters can later be reconciled to provide an audit trail for game play on the machines.

In FIG. 6, often the receiving module 625 of local gaming machine 600 will receive other data in addition to the audio and video content being streamed from the executing game application. For example, in some implementations, this data includes a machine ID identifying the remote gaming machine which sent the particular output data, a time stamp designating a time or times at which the output data was sent, and possibly other information, as desired for the particular implementation. This additional data can be sent, in a sub-channel of the video stream, as a component of the output data, or separate from the output data, depending on the desired implementation. The additional data can also be stored in banks of nonvolatile memory 615, as desired for the particular implementation.

Figure 7:
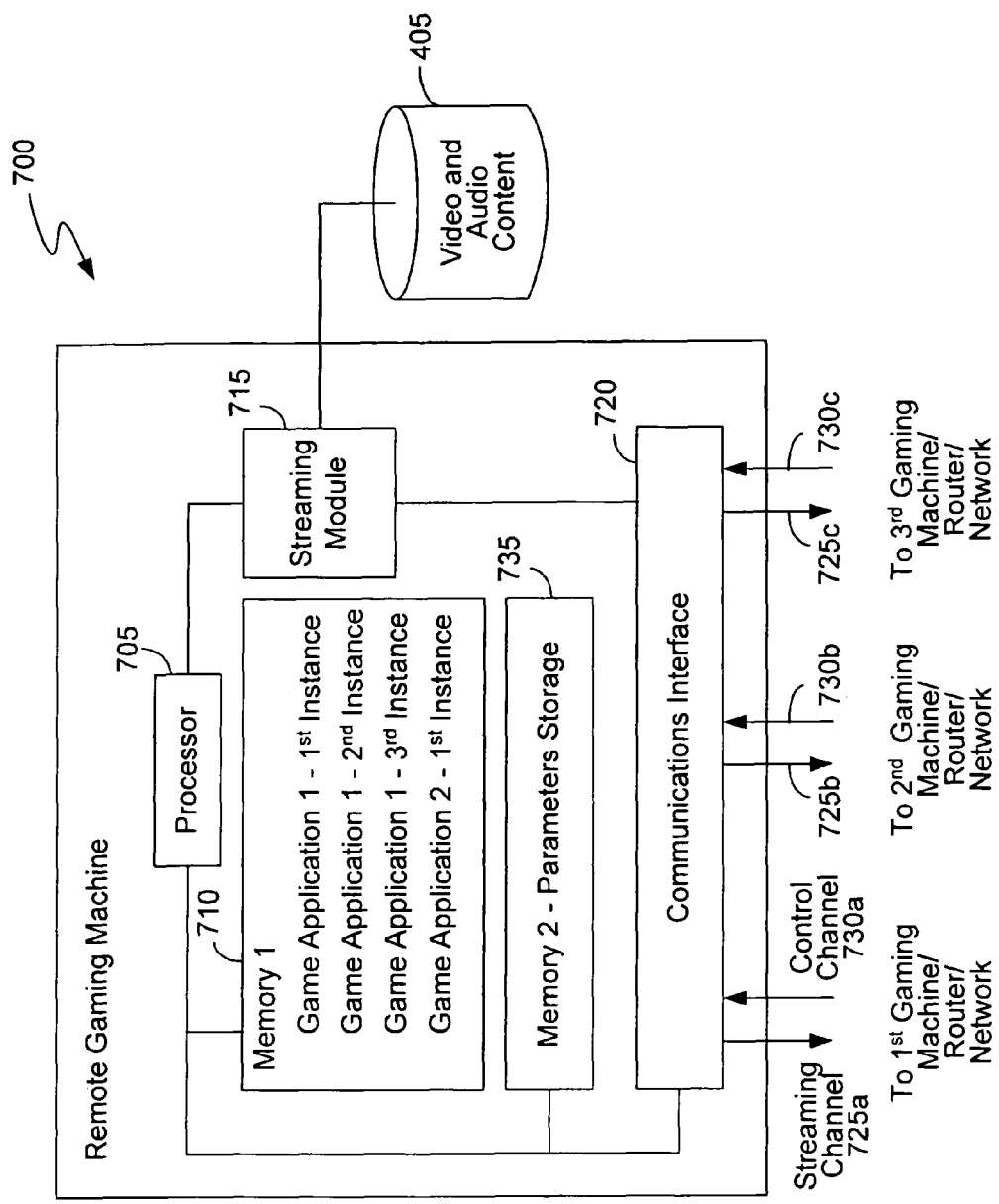
FIG. 7 shows a block diagram of a remote gaming machine apparatus, constructed according to one embodiment of the present invention.

FIG. 7 shows the apparatus 700 of a gaming machine operating as a remote gaming machine in any of the gaming systems described herein. In FIG. 7, the remote gaming machine apparatus includes a processor 705 which handles the execution of the various game applications, including multiple instances of those game applications. When an instance of a game application is executed, the game application is loaded into a first memory 710 and executed by processor 705. In one embodiment, as shown in FIG. 2, the game application is retrieved from an external storage medium, for example, one of storage mediums 205a-205d, and loaded into memory 710 for execution. Embodiments of the present invention provide for the execution of multiple instances of the same game application by remote gaming machine 700. For instance, in FIG. 7, first memory 710 shows the execution of three instances of the same gaming application, Game App 1. Those skilled in the art will appreciate that conventional multitasking methods are implemented to provide the execution of multiple applications, within the processing and memory constraints of the remote gaming machine 700.

In FIG. 7, as those instances of Game App 1 are executed, processor 705 interacts with a streaming module 715 to send output data of those executing instances of game applications, for example, including outcomes of the Game App 1 instances, for streaming over data network 110. As described above with respect to FIGS. 4 and 5, the same video and audio content can be used for multiple instances of the same game application. Thus, in one embodiment described with respect to FIG. 7, each instance of Game App 1 will use some of the same audio and video component files, often pre-rendered, for streaming output data to other requesting gaming machines in the system. In some implementations, the choice of audio and video component files for pre-rendering depends on the usage of those components. That is, the most frequently used components or combinations of components are pre-rendered to make the system more efficient. In this implementation, record-keeping is provided to track the usage of game applications and/or the components output as those game applications are executed.

In one embodiment, the selection of pre-rendered output data components is dependent upon player input. For instance, as will be appreciated by those skilled in the art, often the player can interact with a gaming machine to input game parameter selections such as wager amounts, number of pay lines, maximum bet amount, and other configuration data for game play. In accordance with one method, pre-rendered output data components are appropriate for certain of these inputs, but not for others. In this method, pre-rendered components that most closely match the inputted selections are delivered to the gaming machine to be displayed. Also, in some implementations, the choices of game parameters offered to the player may be limited to selections that will be appropriate for the pre-rendered components.

As multiple instances of certain game applications are played, it is inevitable that certain game applications will not be played, for instance, due to unpopularity of that game. In one embodiment, a method is provided to delete those unused game application instances when some predetermined criteria is satisfied. For instance, when no requests for a particular game application or instance of the game application are received for a predetermined length of time, or from a predetermined number of game requests, that game application is marked for deletion. In this embodiment, the method provides for tracking used and unused game applications by maintaining a "use" record which indicates which games have been played, such as a tally, or more detailed information describing the number, date, time, and other information characterizing use of that game application. In one embodiment, the use record is updated each time a game application instance is executed.

In FIG. 7, the apparatus 700 also includes a suitable communications interface 720 for interacting with the appropriate hardware and software of data network 110, any of the gaming machines 105a-105d in peer-to-peer system 200, and/or video and audio router 305 of system 300. In one embodiment, as shown, the communications interface 720 includes several sets of channels for communicating with multiple gaming machines in the peer-to-peer system. Thus, multiple gaming machines can be interacting with remote gaming machine 700 to play instances of the same game application and other game applications. In one embodiment, as shown in FIG. 7, the communications interface 720 includes pairs of streaming channels 725a-c and control channels 730a-c. The output data from streaming module 715 is sent to a particular gaming machine over the data network and/or video and audio router 305 over one of the streaming channels 725a-725c. Control data, as described herein, for interacting with an instance of an executing game application, is received from any of the various gaming machines through data network 110 and/or video and audio router 305 over one of the control channels 730a-730c.

In FIG. 7, in one embodiment, a second memory 735 stores the parameters of the executing instances of game applications, to later be reconciled with parameters stored in the local gaming machines receiving output data from those executing game applications, as described above with respect to FIG. 6. Those skilled in the art will appreciate that the first and second memories 710 and 735 can be implemented in a single memory device internal or external with respect to remote gaming machine apparatus 700.

Implementations of the present invention provide for auditing and game history dispute resolution by storing captured parameters in memory 615 of the local gaming machine 600 and/or memory 735 of the remote gaming machine 700. Several methods of dispute resolution can be performed in accordance with embodiments of the present invention. In one embodiment, at the remote gaming machine, parameters are stored or otherwise captured from frames using techniques described herein and stored in memory 735, when sent to the local gaming machine. As the output data is received at the local gaming machine, parameters are captured from the received frames and stored in outcome history 615f of memory 615. The frames are output to the display. When a dispute arises, the parameters stored in memory 735 are compared with those in memory 615. In another embodiment, parameters are provided separate from the frames, but are similarly stored at the remote gaming machine when sent, and also then stored at the local gaming machine when received. The two sets of stored parameters are again compared in a dispute. In yet another embodiment, parameters are only captured at the remote gaming machine. When a dispute arises, the parameters at the remote gaming machine govern the outcome. In yet another embodiment, parameters are only captured at the local gaming machine. When a dispute arises, the parameters at the local gaming machine govern.

Figure 8A:
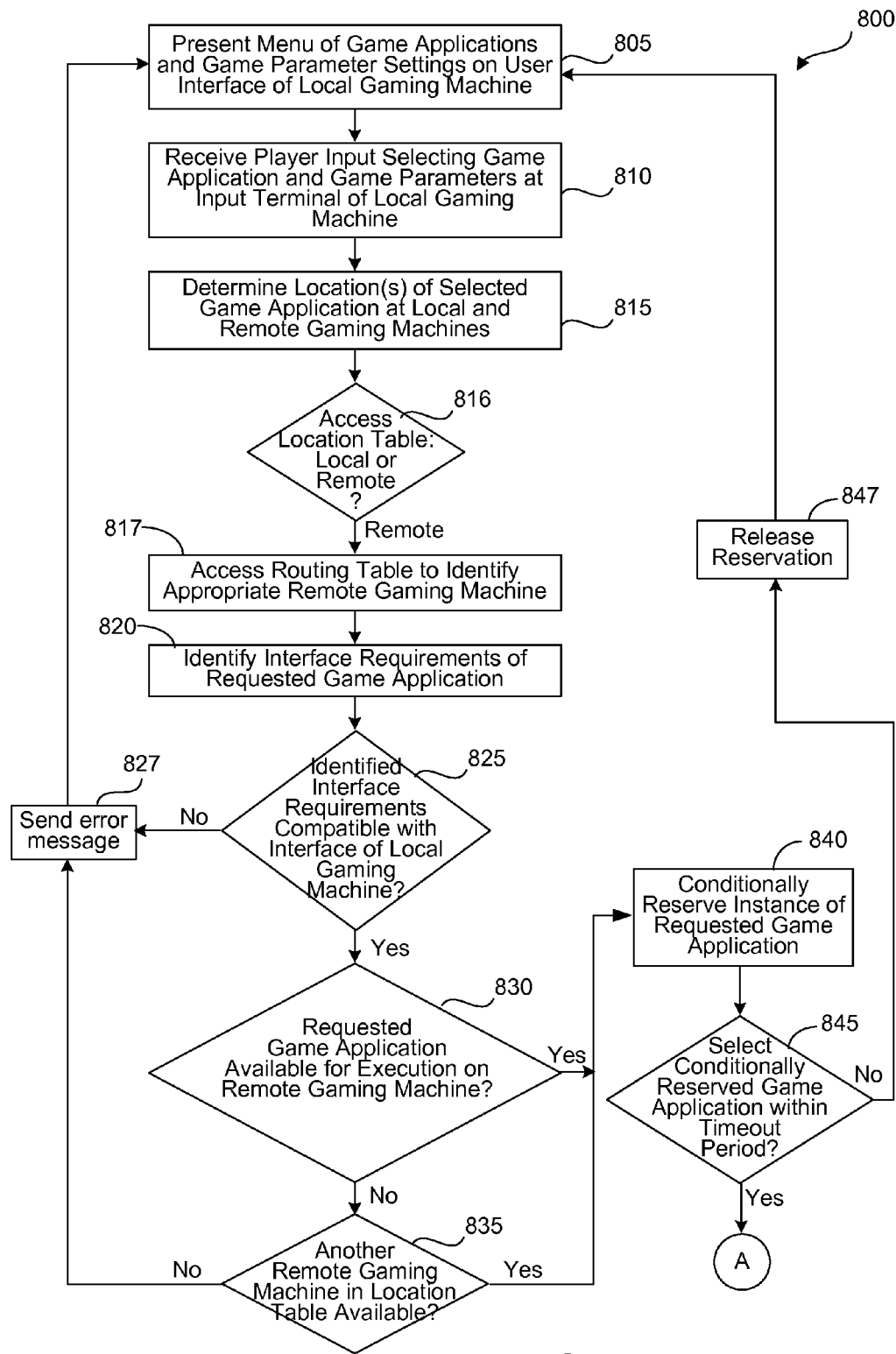
FIGS. 8A and 8B show a flow diagram of a method 800 of remote gaming for providing a game of chance, performed in accordance with one embodiment of the present invention.
Figure 8B:
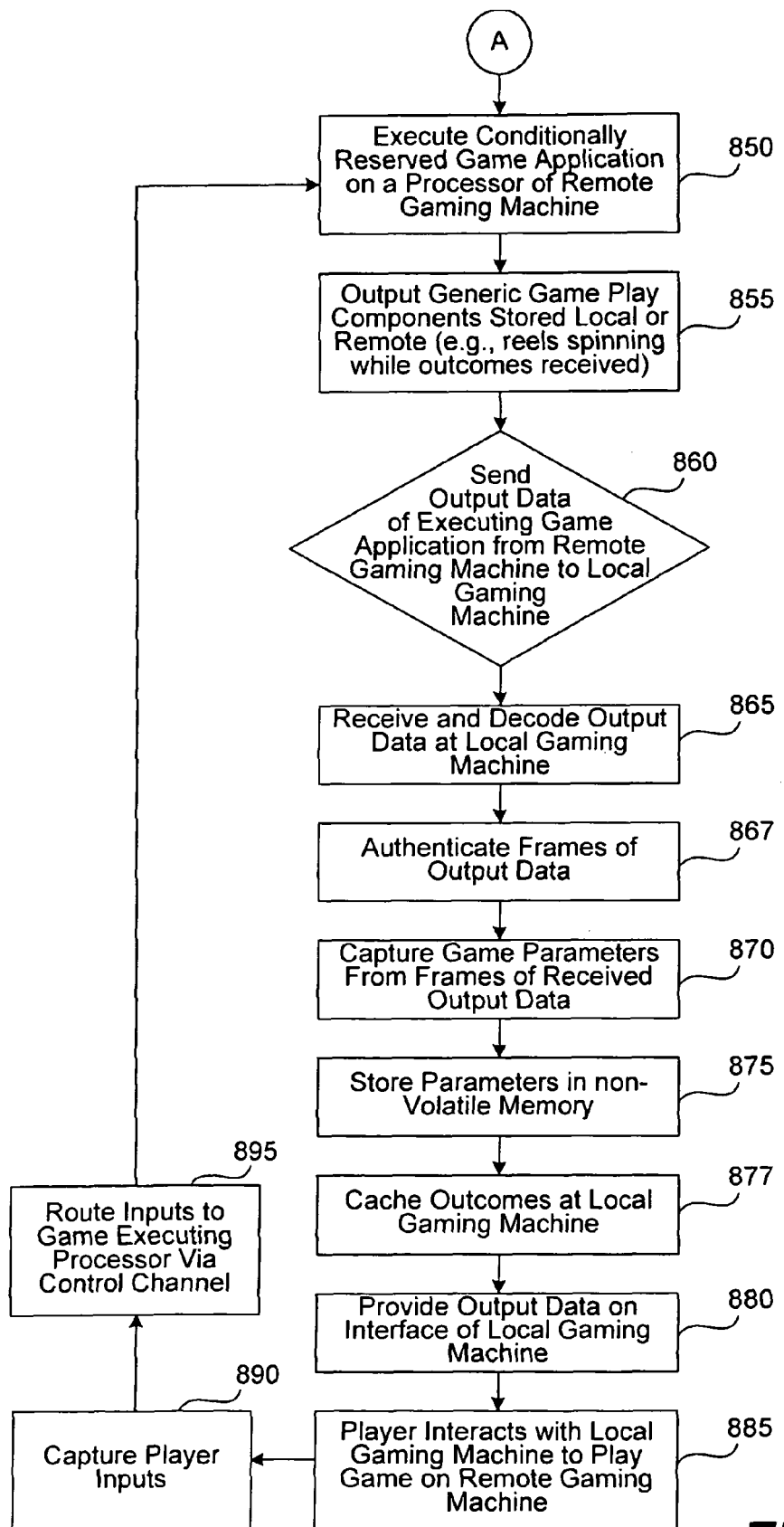

FIGS. 8A and 8B show a flow diagram of a method 800 of remote gaming for providing a game of chance, performed in accordance with one embodiment of the present invention. The method 800 begins in step 805 wherein a menu of game applications is displayed on the user interface of one of the gaming machines in a gaming system. Examples of such menus constructed in accordance with embodiments of the present invention are described below. Using such menus, a player can view game applications available to be played on the local and remote gaming machines in the system. The menu can be updated using techniques described below so that certain game applications available to be played are shown, and others are not shown. In addition, in one embodiment, one or more of the displayed menus provide the player with game parameter settings which the player can select for the requested game. The requested game application can be configured according to the selected parameters. The game parameters can include such information as paylines, wager amounts, and a jackpot. For example, in a slot game, the player can be required to specify wagers and paylines. Such selections can be presented in a pull-down menu on the display for the player to select, or on buttons on the machine in real time when the game is generated and played.

In FIG. 8A, in step 810, a player accesses the menu and interacts with the local gaming machine to select one of the displayed game applications on the menu. Generally, such user input is received at an input terminal or other device of the local gaming machine, as described below. In addition, in implementations where game parameters can be specified, the player provides configuration input setting these parameters. In one embodiment, the configuration input is entered by the player. In another embodiment, the configuration input is read from a player tracking card, or retrieved from a server or other suitable storage facility on the network.

In FIG. 8A, in step 815, responsive to receiving the player selection requesting one of the game applications, the processor 605 in local gaming machine 600 determines the location or locations of the requested game application. That is, the local gaming machine 600 determines whether the requested game application is situated at the local gaming machine and at any remote gaming machines in the system. To this end, in step 816, a location record 210, which can be situated at various locations in the gaming system, is accessed to determine whether the requested game application is located at the local gaming machine or, if not, what remote gaming machines have the application.

Figure 9:
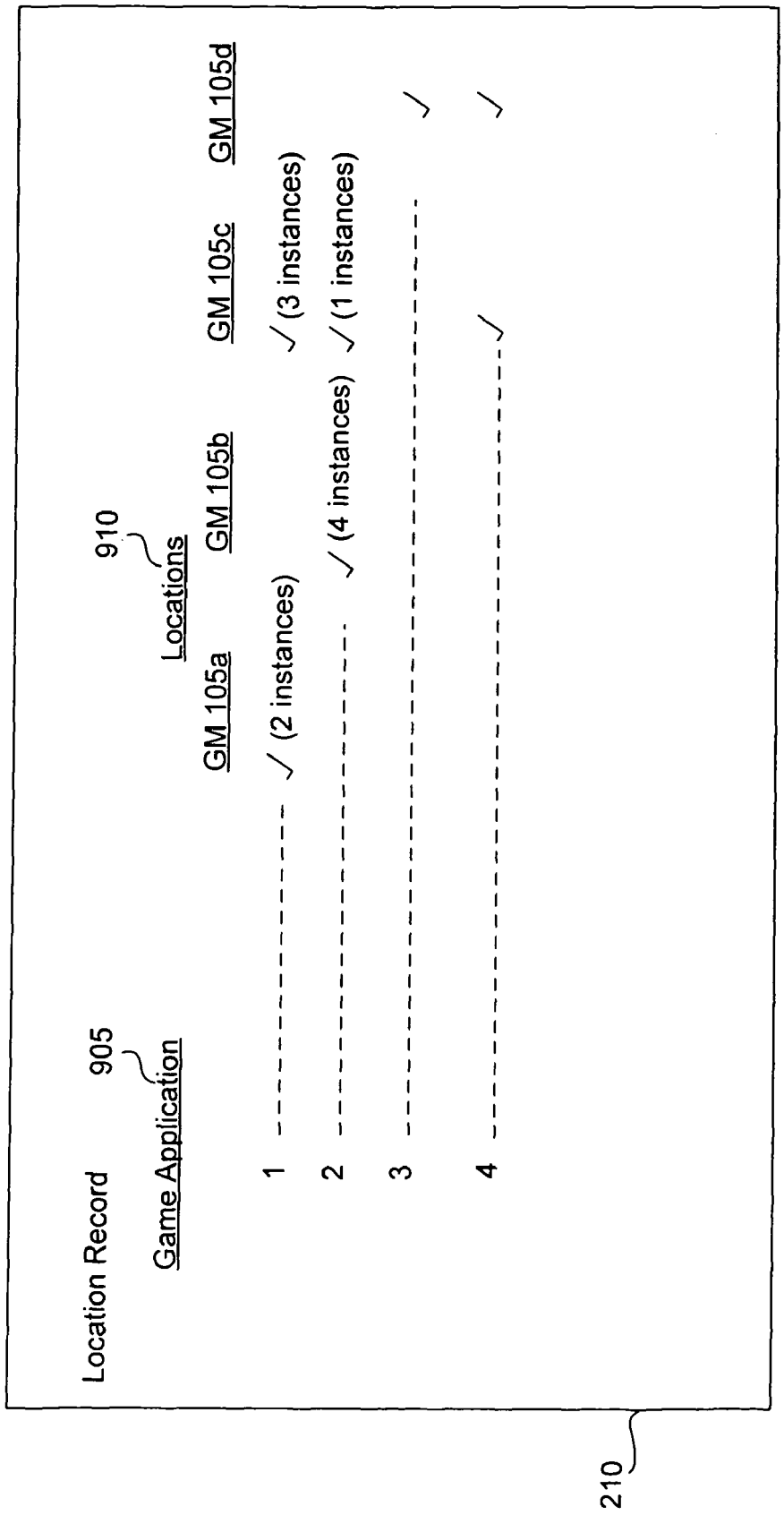
FIG. 9 shows a location record constructed according to one embodiment of the present invention.

In step 816, according to one embodiment, a location record 210 as shown in FIG. 9 is implemented. The location record 210 identifies four game applications in region 905, and the corresponding locations of copies of those game applications in region 910. Those skilled in the art should appreciate that location record 210 can be tailored as desired for the particular gaming system implementation. In one example, as shown in FIG. 9, there are four game applications which can be accessed from the particular local gaming machine 600. In this example, gaming machine 105a is the local gaming machine, and gaming machine 105b-105d are considered remote gaming machines. As shown in FIG. 9, Game App 1 is located at local gaming machine 105a and at remote gaming machine 105c. Game App 2 is located at remote gaming machines 105b and 105c. Game App 3 is located at remote gaming machine 105d, and Game App 4 is located at remote gaming machines 105c and 105d.

In FIG. 9, in one embodiment, the availability of instances of the respective game applications at the various gaming machines is also shown in region 910. The availability of instances of a particular game application can be recorded in the location record 210 by integrating such information from a status message described below, in one embodiment. The availability of instances of one or more game applications at a particular gaming machine can be governed by several factors, described below. By providing such information, in one embodiment, rather than using a routing table, described below, a rule can be implemented for processor 605 in local gaming machine to request the desired game application from the gaming machine having the most instances, or at the nearest network node, or having the least amount of network traffic, or other criteria. Other embodiments constructed in accordance with the present invention provide different rules for the use of location record 210.

Returning to step 816 in FIG. 8A, it is determined whether the requested game application is available at the local gaming machine and, if not, any remote gaming machines having copies of the requested game application, using location record 210 of FIG. 9. Generally, when the requested game application is present at the local gaming machine, the local copy of the game application will be executed rather than requesting execution of the game application at remote gaming machines in the network.

In FIG. 8A, when the requested game application is not at the local gaming machine, in step 817, a routing table is accessed to identify an appropriate one of the remote gaming machines having the requested game application, as indicated by the location record. When a particular remote gaming machine is identified, the method 800 proceeds to step 820 in which interface requirements of the requested game application are identified. In step 825, the identified game application interface requirements are checked for compatibility with the interface of the local gaming machine. In steps 820 and 825, in one embodiment, an interface record 310 can provide the necessary information and be used to make the determination of step 825.

Figure 10:
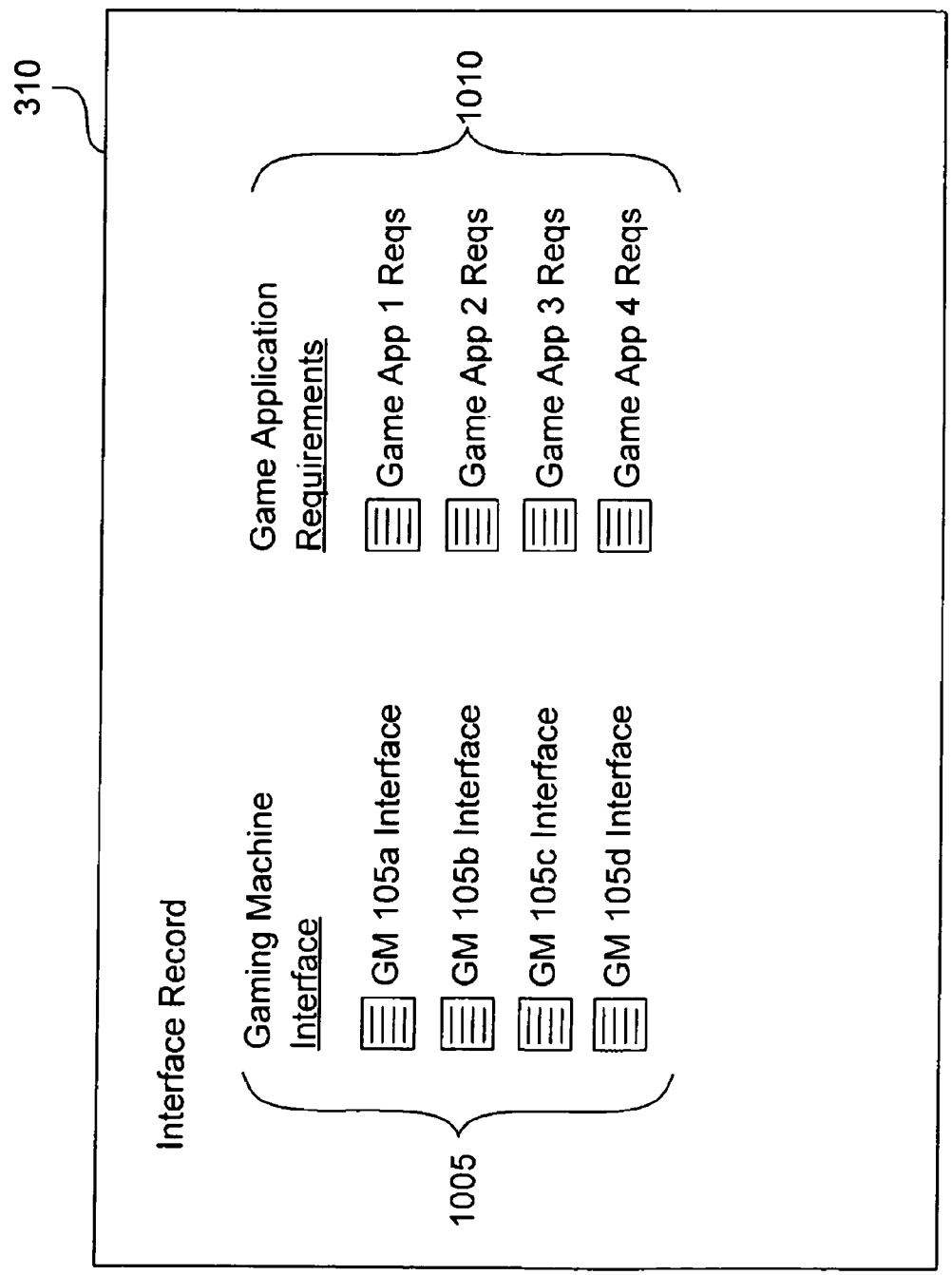
FIG. 10 shows an interface record 310 constructed according to one embodiment of the present invention.

FIG. 10 shows an interface record 310 constructed according to one embodiment of the present invention is shown. In interface record 310, a first region 1005 lists the interface requirements of one or more gaming machines in the network. In one implementation, an interface record 310 is maintained by each gaming machine in the system. In this implementation, the gaming machine interface requirements in region 1005 simply include one set of data defining the interface requirements for that particular gaming machine. In another implementation, as shown in FIG. 10, an interface record 310 provides a central location for interface requirements of all of the gaming machines in the system, as well as the requirements of particular game applications. Thus, in FIG. 10, in region 1005, a separate file or set of data defining the resources available of each gaming machine in the system is provided. For example, each set of interface requirements may define input buttons, display requirements, browsing interface, progressive capability, CPU speed, memory available, hard disk space available, pay lines, denominations, and other specifications as described herein for each gaming machine in the system. In region 1010 of interface record 310, individual files or sets of data are maintained for each game application available in the gaming system. Each set of data defines the interface requirements for that particular game application to be properly output on any gaming machine for game play. Thus, as shown in FIG. 10, a separate set of data providing such requirements is maintained for each game application. A particular set of data defining interface requirements of a game application can include input button requirements, pay line requirements, denominations, pay table percentages, bit levels, particular game display requirements, such as poker games versus slot games, browsing interface, progressive capability, CPU speed, memory available, hard disk space available, and other information. Essentially the game application interface requirements can be defined to include any particular requirements of a gaming machine for the application to be properly output, and any game requirements specific to that game for proper game play.

Returning to step 820 in FIG. 8A, the interface record 310 is used to identify the particular interface requirements, in region 1010, associated with the requested game application such as Game App 1. In step 825, then it is determined whether the identified interface requirements of Game App 1 are compatible with the interface and resources capability of the local gaming machine where the player is located, such as gaming machine 105a in FIG. 1. When the Game App 1 interface requirements are indeed compatible with the interface of gaming machine 105a, the method 800 proceeds to step 830. In step 825, when the respective requirements are not compatible with one another, in step 827, an error message is sent to or within the local gaming machine indicating that the interface requirements of the game application and the gaming machine were incompatible.

In one embodiment, steps 820 and 825 of method 800 are performed separately, that is, off-line with respect to the player providing user input to select game applications. In this way, when the respective interface requirements are incompatible, the game application can be removed from the menu of game applications presented to the player in step 805. Thus, in this situation, the user would not have to experience the error message after requesting game play. Also, in another embodiment, the location record 210 and/or routing table 215 can be updated accordingly, so that game applications incompatible with certain gaming machines are not listed as being available to interact with one another in those records.

In step 830, when the interface requirements are compatible, it is determined whether the requested game application is available for execution on the remote gaming machines identified in step 817. A number of factors can be taken into consideration in determining step 830, including jurisdictional regulations for the jurisdiction in which gaming machines are located, licensing requirements associated with the gaming machines and game applications and imposed on a casino or other facility in which the gaming machines are situated, computational capacity, including processor and memory availability on the gaming machine where the requested application is to be executed, and other factors as desired for the particular implementation. Any one of these factors can serve to limit the number of instances of game applications executing on the remote gaming machine and, hence, prohibit execution of a further instance of a game application in step 830. The various factors and determinations of step 830 are described in greater detail below with respect to FIG. 12.

In step 830, when the requested game application is available, the method 800 proceeds to step 840, described below. In step 830, when the requested game application is unavailable on that gaming machine, the method 800 proceeds to step 835 to identify another remote gaming machine having the requested game application. In one embodiment, a routing table 215, as mentioned above and described in greater detail below, is accessed to determine the proper remote gaming machine to request execution of the desired game application.

Figure 11:
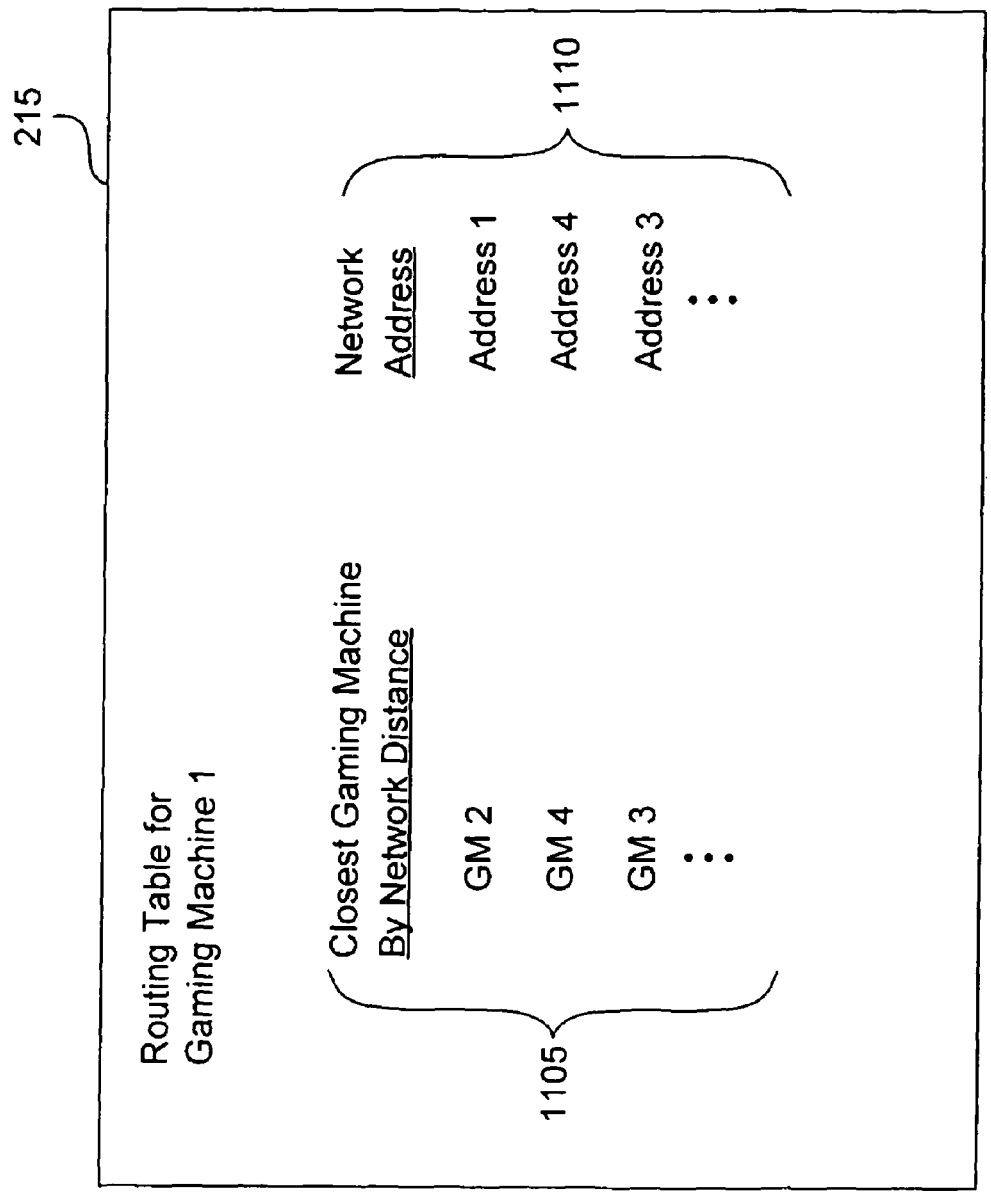
FIG. 11 shows a routing table 215 constructed according to one embodiment of the present invention.

FIG. 11 shows a routing table 215 for a particular gaming machine, constructed according to one embodiment of the present invention. The routing table can be implemented in several ways. In one implementation, the routing table for a particular gaming machine lists in region 1105 the other gaming machines in the network by network distance. That is, the list begins with the closest gaming machine in the system, followed by the next closest gaming machine, and concludes with the furthest gaming machine. In one implementation, a corresponding network address for each gaming machine in region 1105 is shown in region 1110. In one example, the sequence of gaming machines listed in region 1105 is arranged according to the minimum number of nodes to be traversed in a network to reach that gaming machine. That is, the gaming machine having the minimum number of nodes is listed as the first item in the list, and the gaming machine having the highest number of nodes to traverse is at the bottom of the list in region 1105. In another implementation, the list in region 1105 is arranged according to the most recent gaming machine to report availability of a requested game application. Such a report can be made in a status message broadcast to the gaming machines in the system, as described below.

In FIG. 11, in one embodiment, regardless of how the sequence of gaming machines in region 1105 is arranged, the processor 605 of the local gaming machine can access names of gaming machines in the list and send request message to those gaming machines, one by one, until a gaming machine responds that the requested application is available for execution.

In FIG. 8A, in step 835, in one embodiment, a request message is sent to successive gaming machines in list 1105 of routing table 215, requesting: (1) whether the gaming machine has the particular requested game application, and (2) if so, whether the requested game application is available to execute, that is, the same availability determination described above with respect to 830. In another embodiment, the routing table 215 of FIG. 11 is using conjunction with location record 210 of FIG. 9 to determine: (1) the gaming machines at which the requested game application is located, using regions 905 and 910 of location record 210, and then, cross-referencing the routing table 215 of FIG. 11 to determine which of those gaming machines having the requested game application are closest to the local gaming machine or otherwise higher in the list shown in region 1105. And in yet another embodiment, rather than use the routing table 215 of FIG. 11, the location record 210 of FIG. 9 is used to determine which remote gaming machine has the most instances available of the particular requested game application. The remote gaming machine having the highest number of available instances is contacted, and that remote gaming machine will then perform the method of step 830 to determine whether the requested game application is indeed available for execution at that time.

In FIG. 8A, in step 835, when no remote gaming machines have the requested game application, an error message is sent in step 827, and the method 800 returns to step 805. In steps 830 and 835, when a remote gaming machine is identified, having availability to execute the requested game application, the method proceeds to step 840.

In step 840 of FIG. 8A, when it is determined that an instance of the requested game application is available for execution on one of the remote gaming machines, an instance of the requested game application is conditionally reserved for the local gaming machine. To this end, the remote gaming machines having the requested game application can broadcast a status message described below, or otherwise indicate to other gaming machines in the system that that remote gaming machine has 1 fewer instances available at that point in time. Preferably, the remote gaming machine having the requested game application also allocates appropriate processor and memory capacity for execution of the conditionally reserved game application.

In step 845 of FIG. 8A, the method 800 waits for the player to press a button or, otherwise, for the local gaming machine to select the conditionally reserved game application to begin game play. In one embodiment, such a selection is communicated from local gaming machine 600 to the remote gaming machine having the requested game application using control module 620 of FIG. 6 to send the selection. In step 847, when a selection is not made, generally after a predetermined amount of time, the reservation of the requested game application is released and the method returns to step 805. This outcome of step 845 addresses situations where a player changes his mind or for some other reason chooses not to play the conditionally reserved game application. In such situations, it is beneficial to set a predetermined time, such as several minutes, after which the conditional reservation is released so other gaming machines in the system can access the game application. And this way, the system operates at higher efficiency. In addition, any data associated with the reserved instance is preferably erased so that the information does not continue to reside on a storage medium. Thus, timed-out games are not recoverable.

In step 845 of FIG. 8A, when the reserved game application is selected, the method 800 proceeds to step 850. In step 850 of FIG. 8B, the conditionally reserved instance of the requested game application is executed on a processor within the gaming controller of the remote gaming machine, as shown in FIG. 7. In step 855 of FIG. 8B, in one embodiment, processor 705 interacts with streaming modules 715 to retrieve and output any generic game play components from video and audio content storage 405 or another suitable storage medium for output to the local gaming machine over one of streaming channels 725a-725c. "Generic" component refers to video and/or audio files which can be used, regardless of the particular outcomes to present in the executed game application. Examples of such generic game play components include video of spinning reels, card shuffling, desktop layout, user interface and menu, screen background, casino logo, and other common game of chance occurrences. Because of their generic nature, such components can be pre-stored in memory and retrieved as needed during execution of various game applications. By contrast, "non-generic" component refers to video and audio outputs which are specific to the outcomes to be presented in a particular game. Non-generic game play components are generally output by the executing game application rather than being pre-stored and/or pre-rendered. During execution of a typical game, the stream of output data received at the gaming machine and presented on the display and speakers includes interspersed generic and non-generic components.

In alternative embodiments, generic multimedia components are stored at a central data storage medium in the system, or at the local gaming machine. In this way, immediately after a player selects the conditionally reserved game application for execution, the player begins receiving output associated with game play. This immediate output of generic game play components ensures that the player's interest level is sustained and enhances the excitement of the gaming experience. In addition, in step 855, the immediate output of generic game play components can mask any latency which may occur while game outcomes and other game output is generated before being sent to the local gaming machine.

In step 860 of FIG. 8B, at about the time the generic game play components are output, the conditionally reserved game application is executed to generate outcomes and other output data for delivery to the local gaming machine. Such output data, also referred to herein as non-generic components and data, are generated by processor 705 interacting with streaming module 715 of remote gaming machines 700, retrieving video and audio content components 405 as needed. This non-generic output data is sent from streaming module 715 through communications interface 720 to the local gaming machine over the appropriate network apparatus, depending on the desired implementation. As mentioned above, the video and audio content components 405 can include individual files of video and audio data to be output on the local gaming machine. In addition, streaming module 715 preferably embeds any suitable authentication information, such as a digital signature, in one or more frames of the output data. Also, any game parameters can be embedded in one or more frames, as described above, for delivery to the remote gaming machine.

In step 865 of FIG. 8B, the receiving module 625 of local gaming machine 600 receives the output data over the streaming channel. In one embodiment, receiving module 625 includes an MPEG4 decoder or other suitable decoder to decode video and audio data received over the streaming channel. In step 867, preferably the output data is authenticated according to the digital signature or other authentication information embedded in the frames of output data. Such authentication provides security and prevents re-use of delivered outcomes in the output data.

In step 870 of FIG. 8B, data capture module 630 of local gaming machine 600 captures parameters associated with the executing game application from the output data received and decoded by receiving module 625. In one implementation, these parameters are embedded in screens or frames of the video content of the output data. Such parameters can be captured using image recognition and capture techniques such as those described in commonly assigned and co-pending U.S. patent application Ser. No. 10/758,828, entitled "Frame Capture of Actual Game Play," filed Jan. 15, 2004, which is hereby incorporated by reference. In step 875, the captured parameters are stored in nonvolatile memory 615, as shown in FIG. 6. The parameters can include various settings as described above. In another implementation, game parameters are generated at the service and embedded into one of the sub-channels of the streaming channel. These metadata are extracted (captured) at the destination gaming machine's gaming controller.

In FIG. 8B, the method 800 proceeds from step 875 to step 877, where outcomes are cached in cache memory 610 of local gaming machine 600. Such caching of outcomes before output to the player of local gaming machine 600 helps to minimize the perceived effect of network delays. In step 880, the output data received by receiving module 625 is output on the interface, e.g., display of the local gaming machine for the user. In step 885, the user can respond to the output data and interact with the local gaming machine to play the executing game application on the remote gaming machine. In one embodiment, as shown in FIG. 6, a control module 620 receives user input, and other control signals in step 890. Control module 620 sends the signals to the remote gaming machine using an appropriate communications interface 635 coupled to the data network in step 895. Using control module 620, the user is unable to interact with the game application executing on the remote gaming machine.

Figure 12:
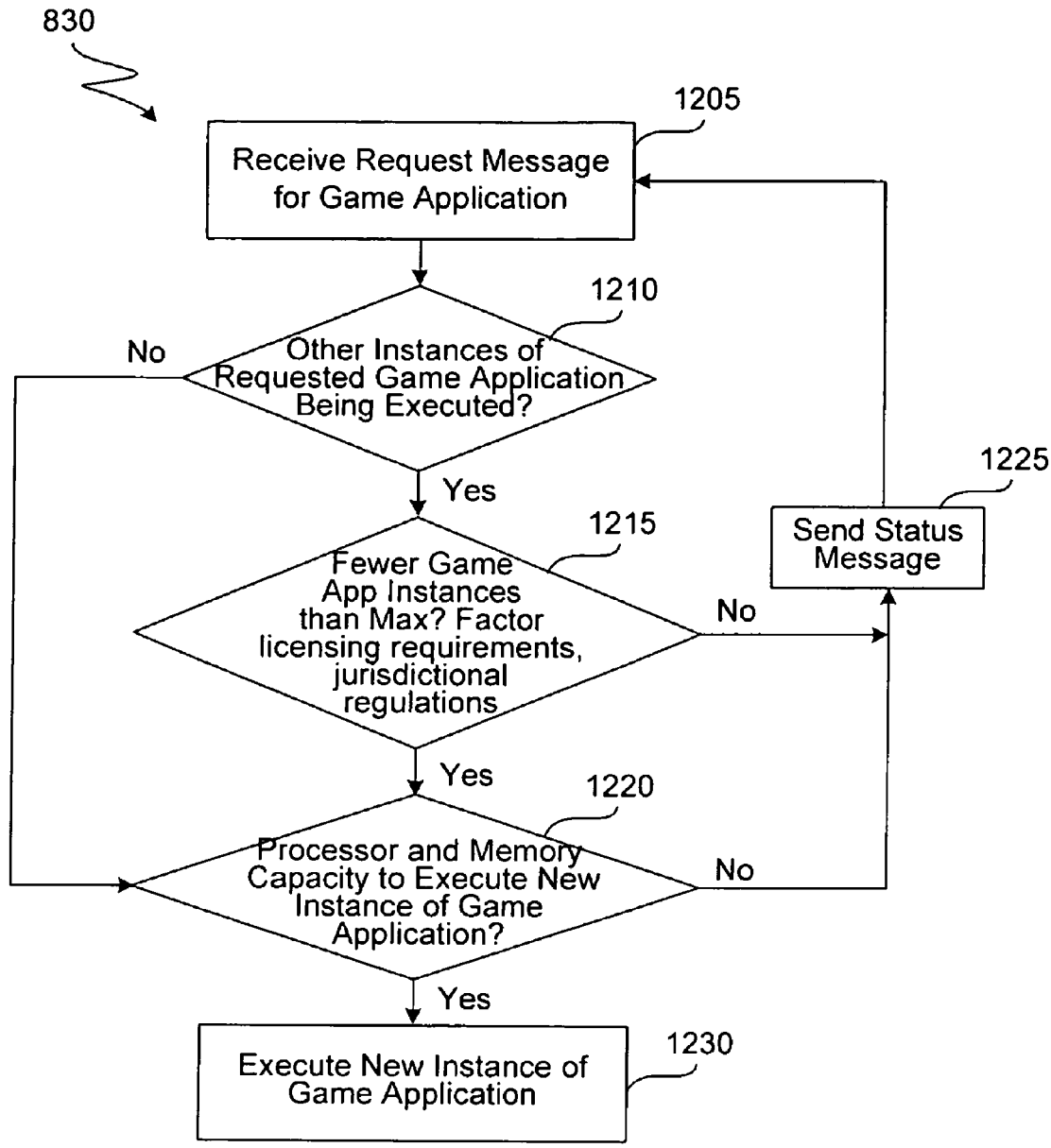
FIG. 12 shows a flow diagram of a method 830 for determining whether a requested game application is available for execution on a remote gaming machine, performed in accordance with one embodiment of the present invention.

FIG. 12 shows a flow diagram of a method 830 for determining whether a requested game application is indeed available for execution on a particular remote gaming machine, corresponding to step 830 of FIG. 8A, performed in accordance with one embodiment of the present invention. In step 1205, the request message from the local gaming machine for the particular game application is received at the remote gaming machine. In step 1210, the remote gaming machine checks to determine whether instances of the requested game application are already being executed at that remote gaming machine. When no other instances are being executed, the method 830 proceeds to step 1220, described below.

In step 1210, when instances of the requested game application are being executed, the method 830 proceeds to step 1215 to determine whether another instance of the requested game application can be executed. In one embodiment, a predetermined maximum number of instances of the particular game application is defined. This maximum can be set as desired for the particular implementation. In one implementation, licensing requirements imposed on the casino dictate that only a certain maximum number of instances of the game application can be executed at a given time. Also, jurisdictional regulations imposed on the jurisdiction in which the gaming machine is situated can be factored in to set this maximum. In step 1215, other factors can be taken into account to determine the maximum number of instances of the game application. Also, in one embodiment, preferably one copy, i.e. instance of the requested game application is always reserved for players who wished to play the game application on the remote gaming machine at which the game application is situated. In this way, a player who interfaces directly with the remote gaming machine will always be provided with game applications stored on that remote gaming machine. In such an embodiment, the predetermined maximum of step 1215 can be reduced by one or more counts of the instances to be reserved for direct game play at that remote gaming machine.

In step 1215 of FIG. 12, when there are fewer game application instances than the predetermined maximum, the method 830 proceeds to step 1220 in which it is determined whether there are sufficient processor and memory capacity to execute a new instance of the game application. For example, the processor and/or memory may already be occupied by instances of the requested game application and instances of other game applications being executed. The determination step 1220 ensures that there is sufficient processor availability and memory to execute an instance of the requested game application without a significant performance hindrance. As those skilled in the art will appreciate, the quantification of available processor and memory capacity will depend greatly on the particular implementation, including the particular processor and memory hardware installed in the gaming machine, as well as the computational demands of the particular game applications.

In step 1220 of FIG. 12, when there are fewer game application instances than the maximum (step 1215), and there are sufficient processor and memory capacity (step 1220), the method 830 proceeds to step 1230, wherein the new instance of the game application can be executed in accordance with method 800 of FIGS. 8A and 8B, described above.

In step 1215 and 1220 of FIG. 12, when the predetermined maximum has been reached, and/or there are insufficient processor and/or memory capacity, the method 830 proceeds to step 1225 in which a status message is sent to the local gaming machine. This status message, in step 1225, generally indicates that another instance of the requested game application cannot be executed for some reason. For example, following step 1215, the status message would indicate that the maximum number of instances of the requested game application are already in progress. Or, following step 1220, the status message would indicate that there are insufficient computational resources to execute a new instance of the requested game application.

In FIG. 12, those skilled in the art should appreciate that the sequence of determining steps 1210-1220 represents one possible implementation of methods for determining availability of a requested game application, performed in accordance with embodiments of the invention. Steps 1210-1220 can be performed in any sequence, and one or more of the steps can be omitted if desired. Other factors important to determining whether to allow the execution of a requested game application at a remote gaming machine can be considered. Alternatively, in one embodiment, two or more of the steps 1210-1220 are performed concurrently following step 1205.

Figure 13:
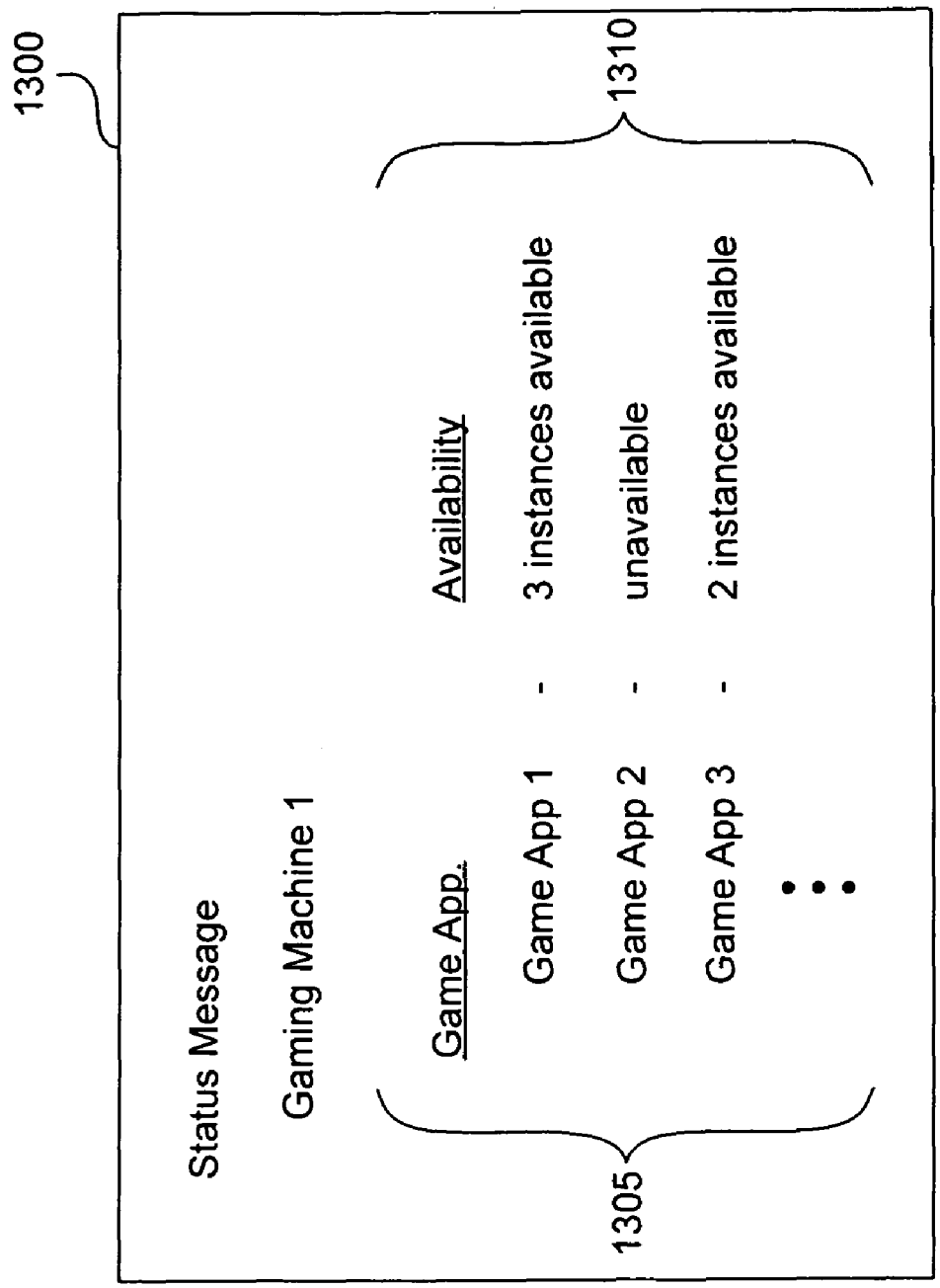
FIG. 13 shows a status message 1300 sent by a remote gaming machine, in accordance with one embodiment of the present invention.

FIG. 13 shows a status message 1300 sent by a remote gaming machine in step 1225 of FIG. 12, according to one embodiment of the present invention. In one embodiment, the status message sent by a particular remote gaming machine is broadcast to all of the gaming machines in the gaming system. In another embodiment, the status message is simply sent to the one local gaming machine requesting the game application. As shown in FIG. 13, in one implementation, the status message 1300 provides a listing of game applications situated on the particular remote gaming machine, in this example, Game App 1, Game App 2 and Game App 3. This list is provided in region 1305 of status message 1300. In another region 1310 of status message 1300, information describes the availability of each game application at the time the status message is sent. For instance, when status message 1300 is sent, three instances of Game App 1 are available, two instances of Game App 3 are available, and Game App 2 is unavailable at the remote gaming machine which sends message 1300. In one embodiment, mentioned above with respect to FIG. 9, the status message can be interpreted by the gaming machines which receive that status message to update location records 210 and routing tables 215. For example, the number of instances of a particular game application can be listed in the record 210, and updated accordingly.

Figure 14:
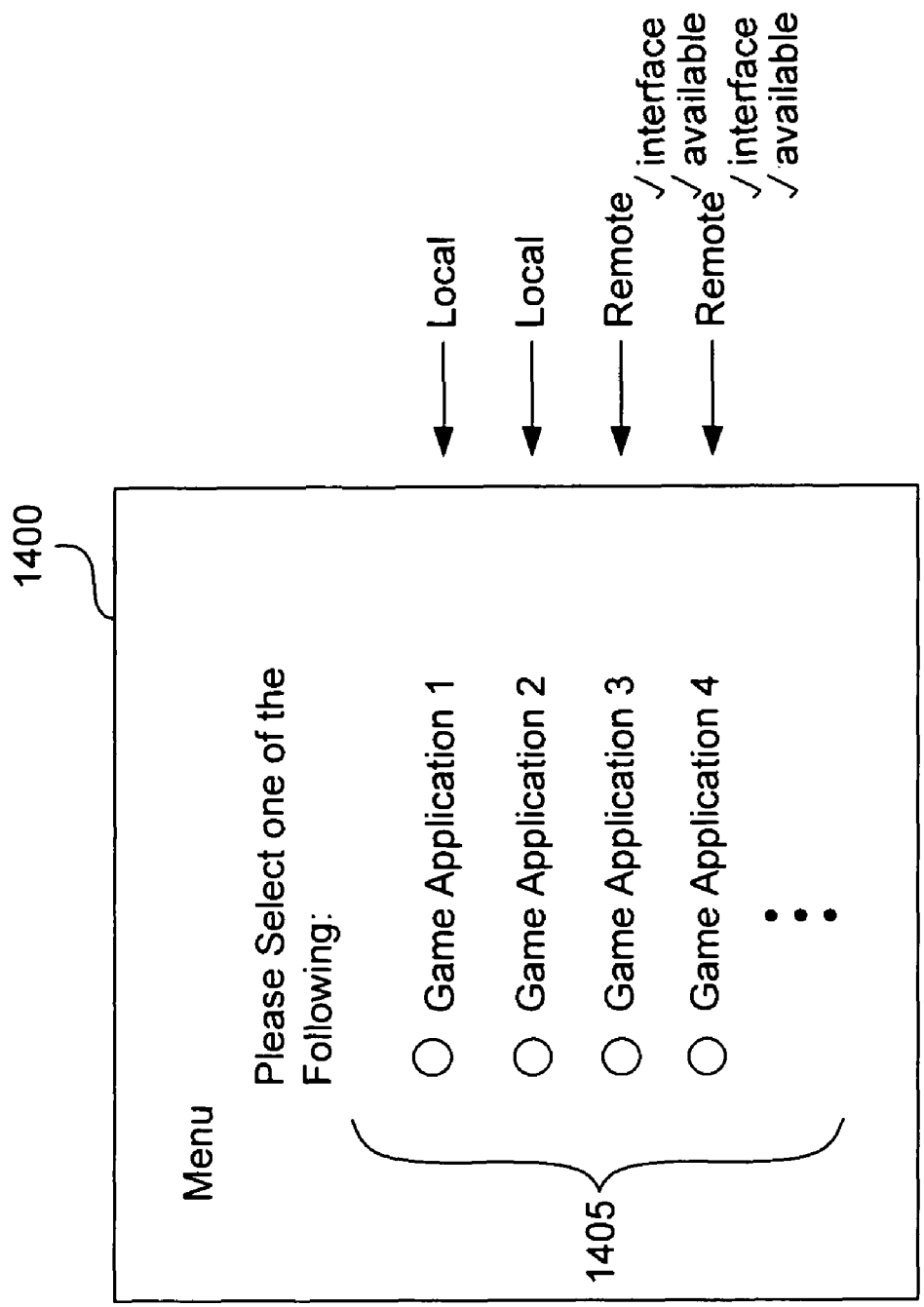
FIG. 14 shows a menu 1400 generated and displayed on a user interface of the local gaming machine, in accordance with one embodiment of the present invention.

FIG. 14 shows a menu displayed on a user interface of the local gaming machine, provided according to one embodiment of the present invention. As shown, the menu 1400 can list any number of various game applications, for example, poker, electronic slots, bingo, black jack, and other games of chance on the system which can be played using that local gaming machine. Unknown to the player, one or more of the listed game applications in menu 1400 can be physically located on another gaming machine, that is, a remote gaming machine, in the gaming system. For example, in FIG. 14, unknown to the user, Game App 1 and Game App 2 are stored locally on the local gaming machine, while Game App 3 and Game App 4 are stored remotely on different gaming machines in the system. On the interface, when the player selects one of the graphical buttons 1405 associated with a particular game applications, the methods described above are initiated.

Figure 15:
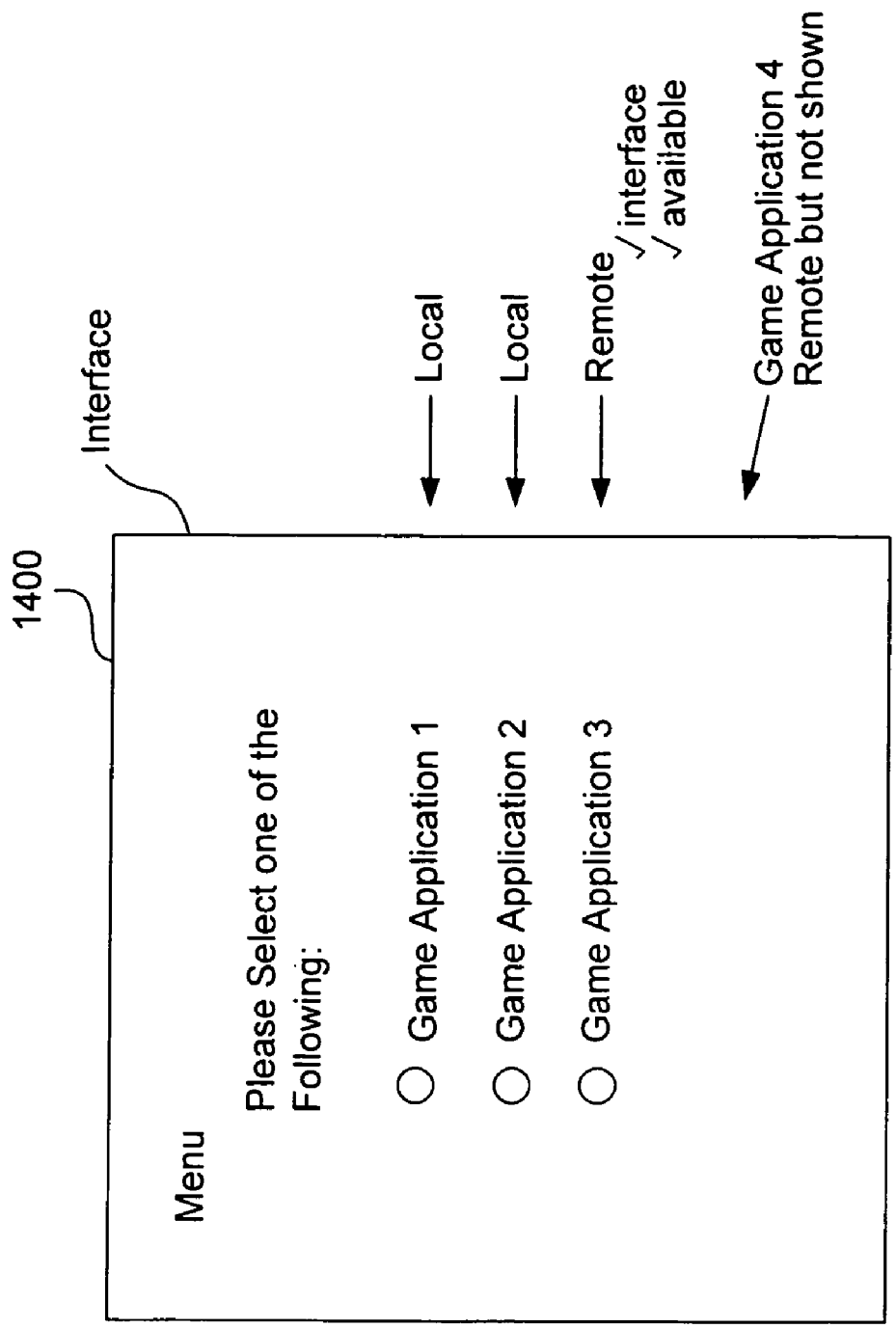
FIG. 15 shows menu 1400 generated and displayed on a user interface of the local gaming machine, in accordance with another embodiment of the present invention.

In FIG. 15, the menu 1400 is shown following an update performed responsive to the methods described above with respect to FIGS. 8 and 12. In this example, Game App 4, as shown in FIG. 14, has been removed from menu 1400. This is because, for example, following the determination as to interface compatibility in steps 820 and 825 of FIG. 8A, or the determination of requested game application unavailability, in step 830 of FIGS. 8 and 12, it is determined that another instance of Game App 4 cannot be executed. In this example, a status message 1300 was sent to the local gaming machine from the remote gaming machine on which Game App 4 was stored. In this embodiment, responsive to receiving the status message, the local gaming machine updated the menu 1400 to remove Game App 4 from the list. In this way, a player of the local gaming machine would preferably not see Game App 4 in the menu. In this way, the player would be spared the frustration of selecting Game App 4 to play, only to later discover that this desired game application was unavailable.

In one embodiment, a failsafe mechanism is implemented in a gaming system constructed according to one embodiment of the present invention. This failsafe mechanism provides a method for maintaining remote game play on a particular remote gaming machine when a network error or other malfunction occurs, hindering further remote game play using that particular remote gaming machine. In this embodiment, using a routing table and/or location table described above, a further one of the remote gaming machines having the game application is identified, applying the methods described above with respect to FIGS. 8 and 12. When it is confirmed that a further instance of the requested game application can be executed on the identified remote gaming machine, execution begins, and remote game play is transferred from the remote gaming machine on which game play was initiated to the newly identified remote gaming machine. This transfer step involves communicating a status of the game application from the newly identified remote gaming machine. In one embodiment, the communication of this status information includes providing one or more parameters stored in memory 615 of the local gaming machine to the newly identified remote gaming machine. In another embodiment, the parameters are retrieved from another storage location on the network, such as the original remote gaming machine, and provided to the newly identified remote gaming machine. Other status information facilitating a transfer of remote game play execution can be transferred, as will be appreciated by those skilled in the art.

In addition to the techniques described herein, techniques for the transfer of game play from one gaming machine to another are described in U.S. patent application Ser. No. 11/224,814/, filed concurrently herewith, for METHOD AND SYSTEM FOR INSTANT-ON GAME DOWNLOAD, which is hereby incorporated by reference. Such techniques are considered within the spirit and scope of the present invention, and are particularly beneficial to provide the user with a near-continuous game play experience in the unlikely circumstance of network failure or other error that might otherwise hinder remote game play.

Figure 16:
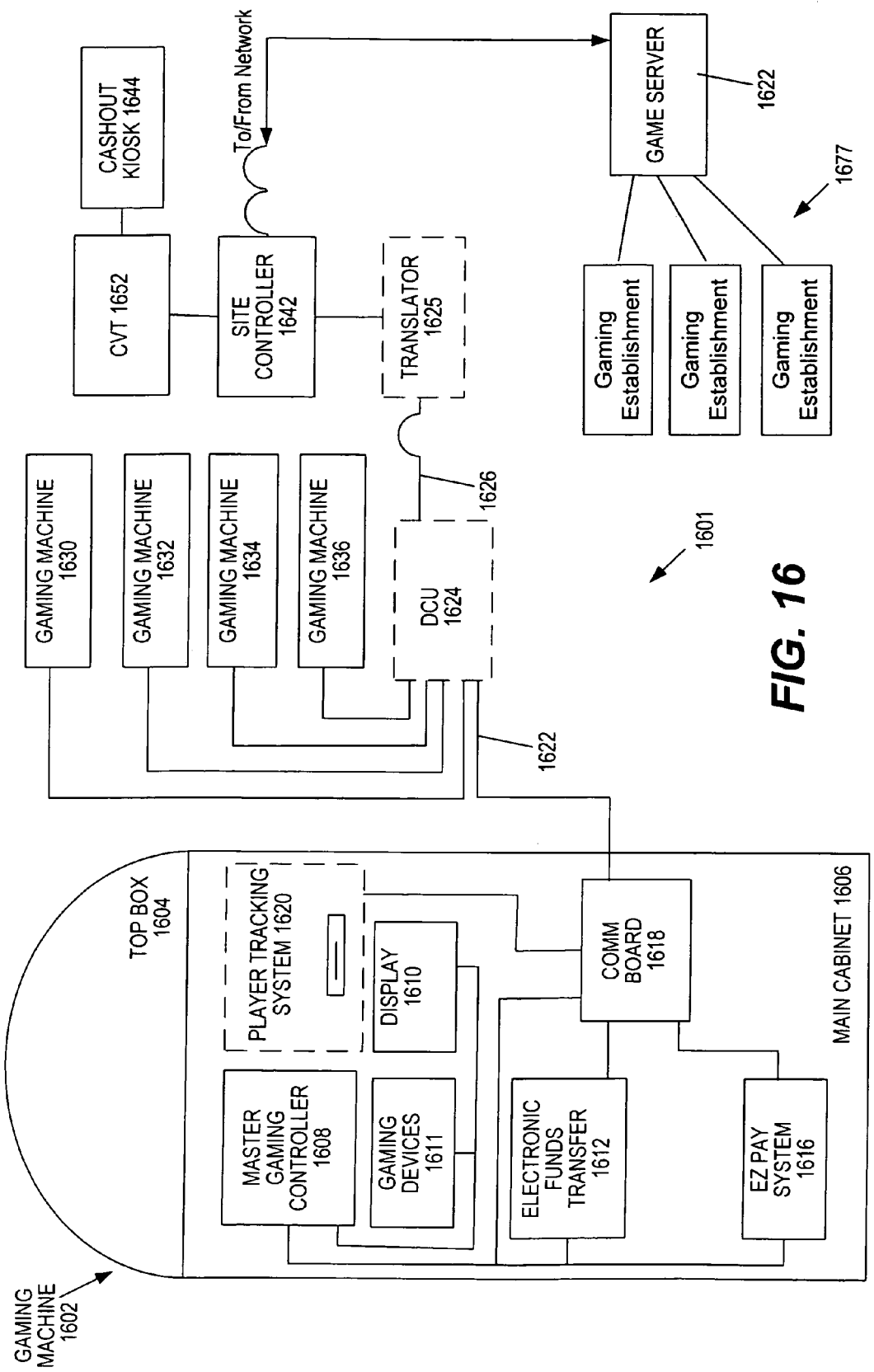
FIG. 16 is a block diagram of a number of gaming machines in a gaming network that may be configured to implement some methods of the present invention.

One example of a gaming system, also referred to herein as a gaming network, that may be used to implement methods performed in accordance with embodiments of the invention is depicted in FIG. 16. Gaming establishment 1601 could be any sort of gaming establishment, such as a casino, a card room, an airport, a store, etc. In this example, gaming network 1677 includes more than one gaming establishment, all of which are networked to game server 1622.

Here, gaming machine 1602, and the other gaming machines 1630, 1632, 1634, and 1636, include a main cabinet 1606 and a top box 1604. The main cabinet 1606 houses the main gaming elements and can also house peripheral systems, such as those that utilize dedicated gaming networks. The top box 1604 may also be used to house these peripheral systems.

The master gaming controller 1608 controls the game play on the gaming machine 1602 according to instructions and/or game data from game server 1622 or stored within gaming machine 1602 and receives or sends data to various input/output devices 1611 on the gaming machine 1602. In one embodiment, master gaming controller 1608 includes processor(s) and other apparatus of the gaming machines described above in FIGS. 6 and 7. The master gaming controller 1608 may also communicate with a display 1610.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1608 may also communicate with EFT system 1612, EZPay™ system 1616 (a proprietary cashless ticketing system of the present assignee), and player tracking system 1620. The systems of the gaming machine 1602 communicate the data onto the network 1622 via a communication board 1618.

It will be appreciated by those of skill in the art that embodiments of the present invention could be implemented on a network with more or fewer elements than are depicted in FIG. 16. For example, player tracking system 1620 is not a necessary feature of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment.

Moreover, DCU 1624 and translator 1625 are not required for all gaming establishments 1601. However, due to the sensitive nature of much of the information on a gaming network (e.g., electronic find transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machine are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1642 provides this function for gaming establishment 1601. Site controller 1642 is connected to a central system and/or other gaming establishments via one or more networks, which may be public or private networks. Among other things, site controller 1642 communicates with game server 1622 to obtain game data, such as ball drop data, bingo card data, etc.

In the present illustration, gaming machines 1602, 1630, 1632, 1634 and 1636 are connected to a dedicated gaming network 1622. In general, the DCU 1624 functions as an intermediary between the different gaming machines on the network 1622 and the site controller 1642. In general, the DCU 1624 receives data transmitted from the gaming machines and sends the data to the site controller 1642 over a transmission path 1626. In some instances, when the hardware interface used by the gaming machine is not compatible with site controller 1642, a translator 1625 may be used to convert serial data from the DCU 1624 to a format accepted by site controller 1642. The translator may provide this conversion service to a plurality of DCUs.

Further, in some dedicated gaming networks, the DCU 1624 can receive data transmitted from site controller 1642 for communication to the gaming machines on the gaming network. The received data may be, for example, communicated synchronously to the gaming machines on the gaming network.

Here, CVT 1652 provides cashless and cashout gaming services to the gaming machines in gaming establishment 1601. Broadly speaking, CVT 1652 authorizes and validates cashless gaming machine instruments (also referred to herein as "tickets" or "vouchers"), including but not limited to tickets for causing a gaming machine to display a game result and cash-out tickets. Moreover, CVT 1652 authorizes the exchange of a cashout ticket for cash. These processes will be described in detail below. In one example, when a player attempts to redeem a cash-out ticket for cash at cashout kiosk 1644, cash out kiosk 1644 reads validation data from the cashout ticket and transmits the validation data to CVT 1652 for validation. The tickets may be printed by gaming machines, by cashout kiosk 1644, by a stand-alone printer, by CVT 1652, etc. Some gaming establishments will not have a cashout kiosk 1644. Instead, a cashout ticket could be redeemed for cash by a cashier (e.g. of a convenience store), by a gaming machine or by a specially configured CVT.

Figure 17:
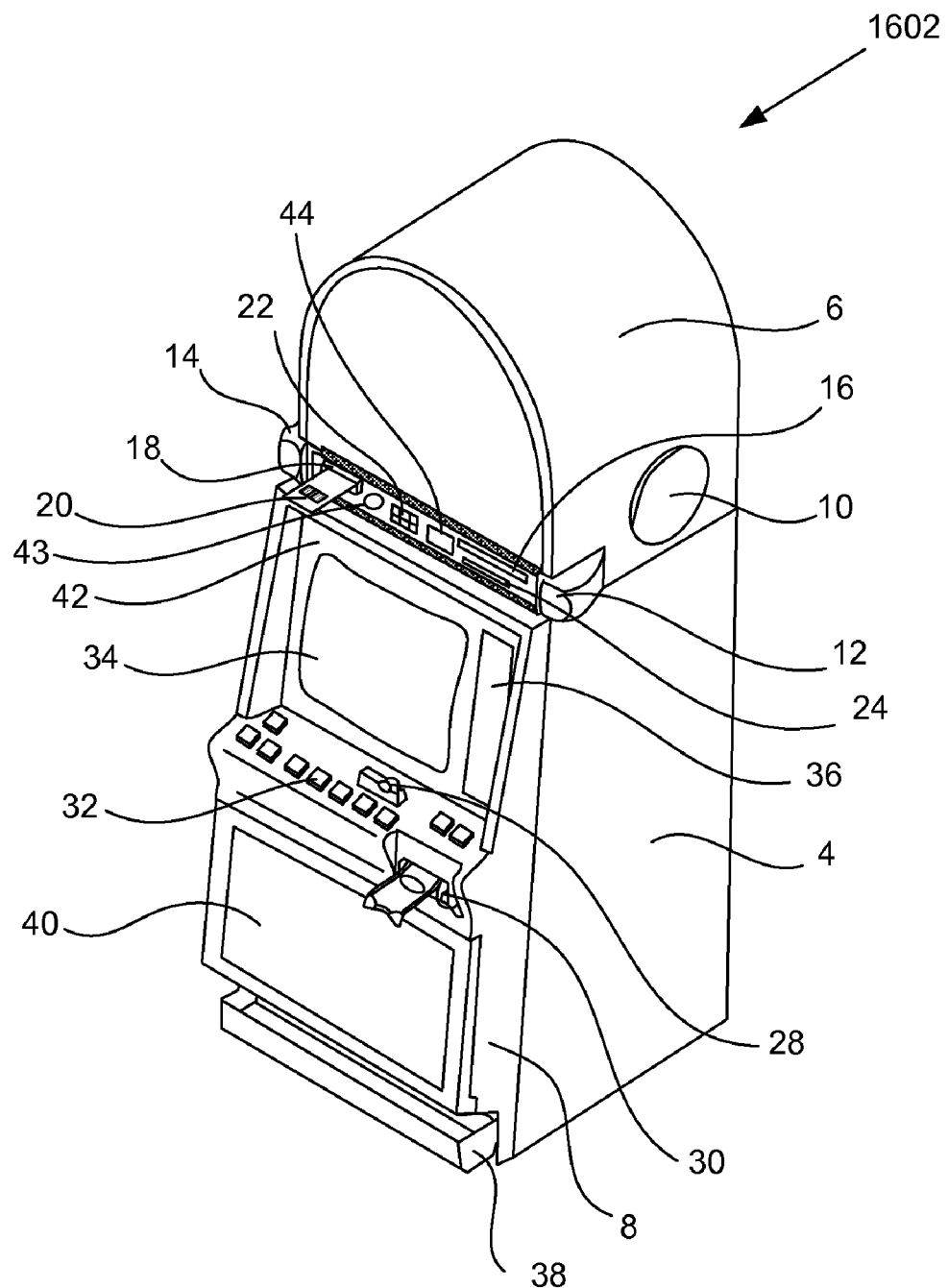
FIG. 17 illustrates an exemplary gaming machine that may be configured to implement some methods of the present invention.

Turning to FIG. 17, more details of gaming machine 1602 are described. Machine 1602 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 1602. The devices are controlled by circuitry housed inside the main cabinet 4 of the machine 1602.

The gaming machine 1602 includes a top box 6, which sits on top of the main cabinet 4. The top box 6 houses a number of devices, which may be used to add features to a game being played on the gaming machine 1602, including speakers 10, 12, and 14, a ticket printer 18 which may print bar-coded tickets 20 used as cashless instruments. The player tracking unit mounted within the top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 for display various light patterns used to convey gaming information. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 1602 is but one example from a wide range of gaming machine designs on which the present invention may be implemented. For example, not all suitable gaming machines have top boxes or player tracking features. Further, some gaming machines have two or more game displays—mechanical and/or video. Some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present can be deployed on most gaming machines now available or hereafter developed. Moreover, some aspects of the invention may be implemented on devices which lack some of the features of the gaming machines described herein, e.g., workstation, desktop computer, a portable computing device such as a personal digital assistant or similar handheld device, a cellular telephone, etc. U.S. patent application Ser. No. 09/967,326, filed Sep. 28, 2001 and entitled "Wireless Game Player," is hereby incorporated by reference for all purposes.

Returning to the example of FIG. 17, when a user wishes to play the gaming machine 1602, he or she inserts cash through the coin acceptor 28 or bill validator 30. In addition, the player may use a cashless instrument of some type to register credits on the gaming machine 1602. For example, the bill validator 30 may accept a printed ticket voucher, including 20, as an indicium of credit. As another example, the card reader 24 may accept a debit card or a smart card containing cash or credit information that may be used to register credits on the gaming machine.

During the course of a game, a player may be required to make a number of decisions. For example, a player may vary his or her wager on a particular game, select a prize for a particular game, or make game decisions regarding gaming criteria that affect the outcome of a particular game (e.g., which cards to hold). The player may make these choices using the player-input switches 32, the video display screen 34 or using some other hardware and/or software that enables a player to input information into the gaming machine (e.g. a GUI displayed on display 16).

During certain game functions and events, the gaming machine 1602 may display visual and auditory effects that can be perceived by the player. These effects add to the excitement of a game, which makes a player more likely to continue playing. Auditory effects include various sounds that are projected by the speakers 10, 12, and 14. Visual effects include flashing lights, strobing lights or other patterns displayed from lights on the gaming machine 1602, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 1602. In some embodiments, these tickets may be used by a game player to obtain game services.

IGT gaming machines are implemented with special features and/or additional circuitry that differentiate them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator of a gaming machine from manipulating hardware and software in a manner that gives them an unfair and some cases an illegal advantage. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware components, software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset time frame, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Each function of the game (bet, play, result, etc.) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, etc. This is critical to ensure the player's wager and credits are preserved. Typically, battery backed RAM devices are used to preserve this critical data. These memory devices are not used in typical general-purpose computers.

IGT gaming computers normally contain additional interfaces, including serial interfaces, to connect to specific subsystems internal and external to the slot machine. As noted above, some preferred embodiments of the present invention include parallel, digital interfaces for high-speed data transfer. However, even the serial devices may have electrical interface requirements that differ from the "standard" EIA 232 serial interfaces provided by general-purpose computers. These interfaces may include EIA 485, EIA 422, Fiber Optic Serial, Optically Coupled Serial Interfaces, current loop style serial interfaces, etc. In addition, to conserve serial interfaces internally in the slot machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the trusted memory device contents in a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives.

Mass storage devices used in a general-purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Gaming machines used for Class III games generally include software and/or hardware for generating random numbers. However, gaming machines used for Class II games may or may not have RNG capabilities. In some machines used for Class II games, RNG capability may be disabled.

Figure 18:
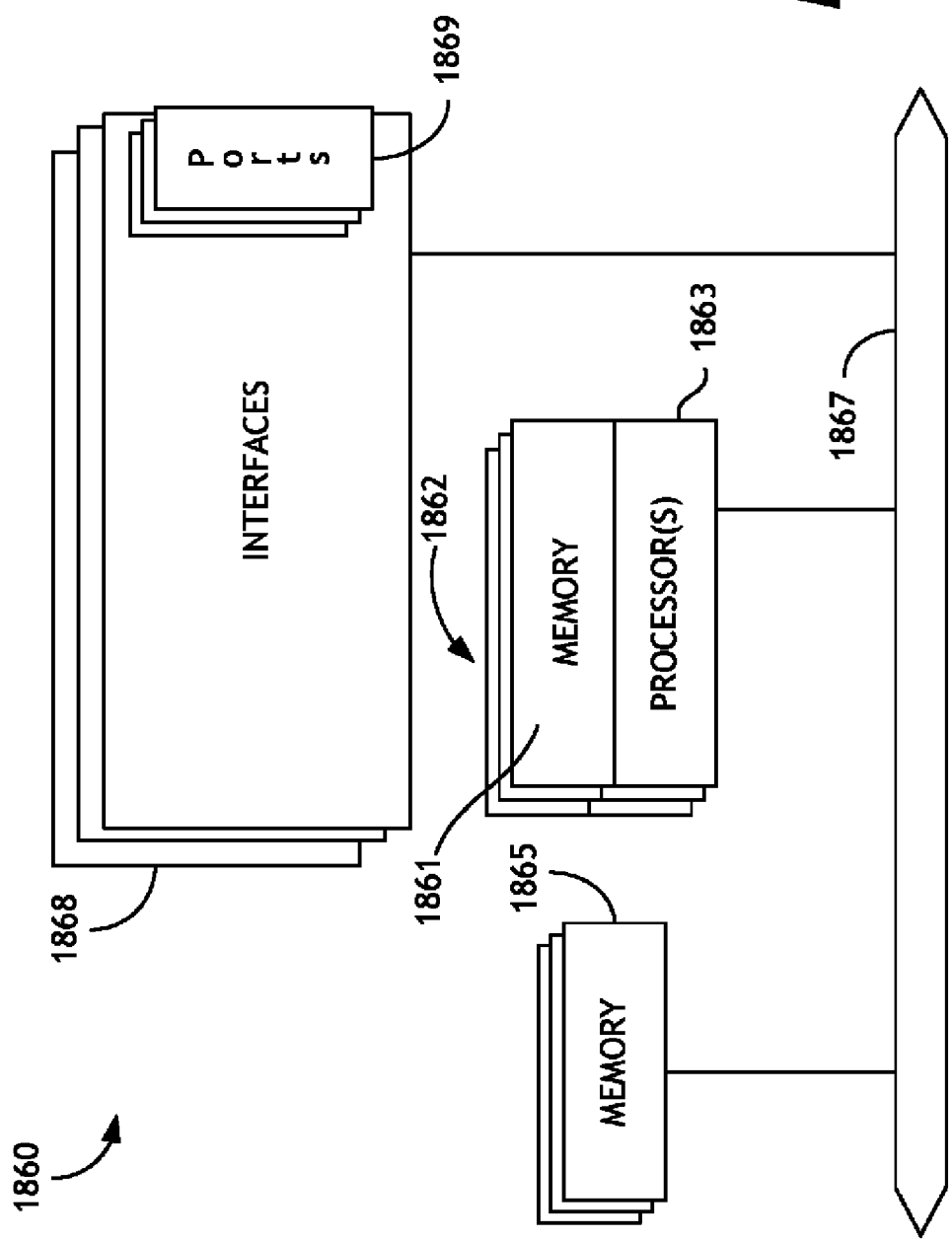
FIG. 18 is a block diagram of an exemplary network device that may be configured as a game server to implement some methods of the present invention.

FIG. 18 illustrates an example of a network device that may be configured as a game server for implementing some methods of the present invention. Network device 1860 includes a master central processing unit (CPU) 1862, interfaces 1868, and a bus 1867 (e.g., a PCI bus). Generally, interfaces 1868 include ports 1869 appropriate for communication with the appropriate media. In some embodiments, one or more of interfaces 1868 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1868 control such communications-intensive tasks as encryption, decryption, compression, decompression, packetization, media control and management. By providing separate processors for the communications-intensive tasks, interfaces 1868 allow the master microprocessor 1862 efficiently to perform other functions such as routing computations, network diagnostics, security functions, etc.

The interfaces 1868 are typically provided as interface cards (sometimes referred to as "linecards"). Generally, interfaces 1868 control the sending and receiving of data packets over the network and sometimes support other peripherals used with the network device 1860. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1862 may be responsible for implementing specific functions associated with the functions of a desired network device. According to some embodiments, CPU 1862 accomplishes all these functions under the control of software including an operating system and any appropriate applications software.

CPU 962 may include one or more processors 1863 such as a processor from the Motorola family of microprocessors or the MIPS family of microprocessors. In an alternative embodiment, processor 1863 is specially designed hardware for controlling the operations of network device 1860. In a specific embodiment, a memory 1861 (such as non-volatile RAM and/or ROM) also forms part of CPU 1862. However, there are many different ways in which memory could be coupled to the system. Memory block 1861 may be used for a variety of purposes such as, for example, caching and/or storing data, programming instructions, etc.

Regardless of network device's configuration, it may employ one or more memories or memory modules (such as, for example, memory block 1865) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 18 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 18) or switch fabric based (such as a cross-bar).

Figure 19:
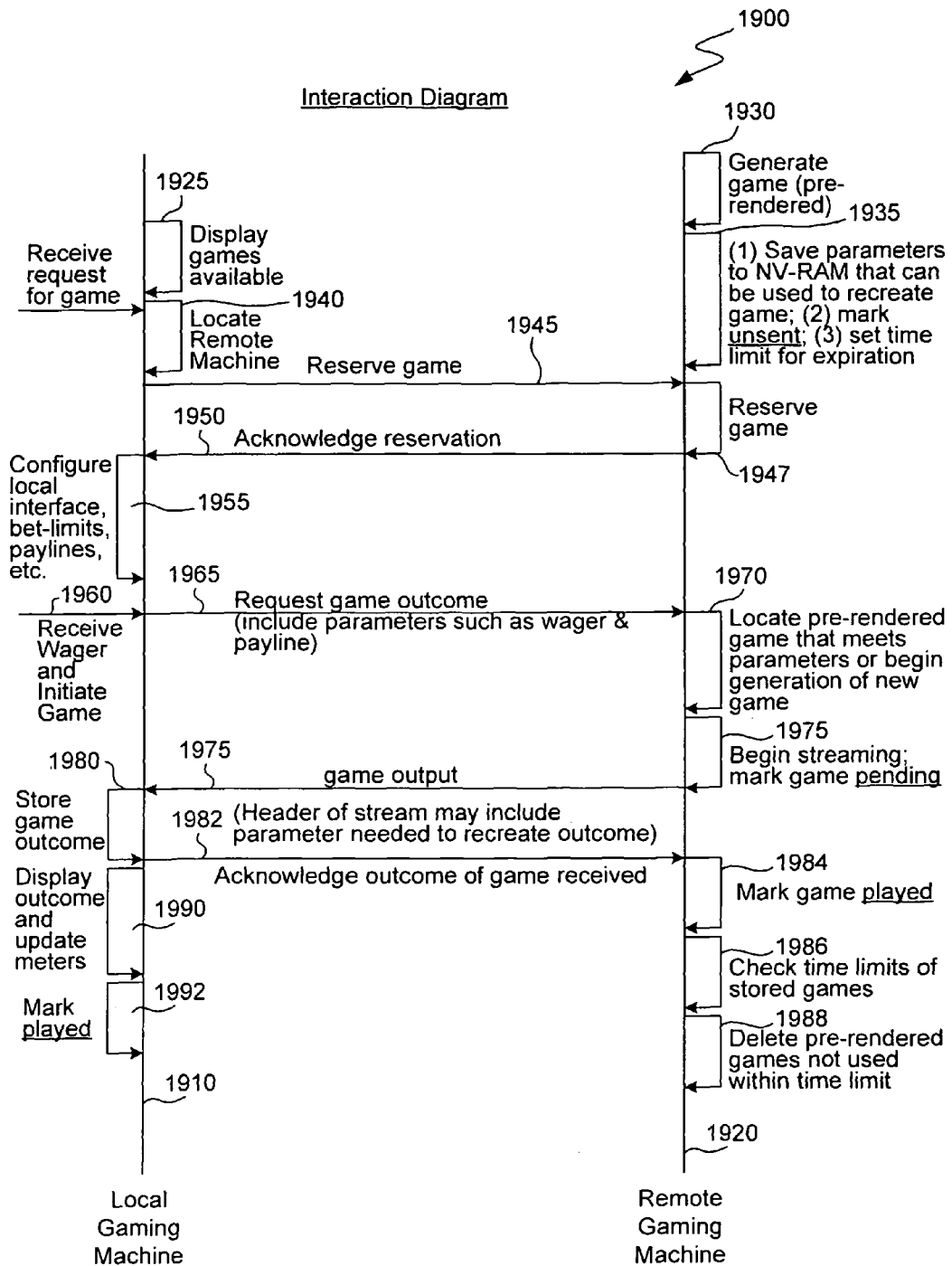
FIG. 19 shows an interaction diagram of a method of remote gaming for providing a game of chance, performed in accordance with one embodiment of the present invention.

FIG. 19 shows an interaction diagram of a method of remote gaming for providing a game of chance, performed in accordance with one embodiment of the present invention. In FIG. 19, the interaction diagram shows the processing occurring at a local gaming machine 1910, the processing at a remote gaming machine 1920, and the interaction between the remote and local gaming machines. Certain steps of the interaction diagram 1900 are described above, particularly with respect to FIGS. 8A and 8B.

In FIG. 19, processing on the local gaming machine 1910 begins in step 1925 with displaying a list of games available for play. On the remote gaming machine 1920, at some time before the player is allowed to select a game, at least portions of the available game applications are generated and, in some instances, pre-rendered in step 1930. In step 1935, parameters associated with the game or games are stored in non-volatile RAM. These game parameters can be used to recreate the game in the event of a network failure or other error causing game play to cease. Also, in step 1935, before streaming begins, preferably game applications are marked with an appropriate status indicator such as "unsent." Also, in step 1935, a predetermined time limit to delete unused games is set, further described in step 1988 below.

In FIG. 19, in step 1940, when a request for a particular game application is received from a player at the local gaming machine, in step 1940, the appropriate remote gaming machine having the requested game application is located using techniques described above. In step 1945, after the requested application is identified, the game application is preferably reserved in step 1947, as described above, on the remote gaming machine. In one embodiment, an acknowledge message confirming the reservation is sent in step 1950 from the remote gaming machine back to the local gaming machine. In step 1955, the interface of the local gaming machine is configured according to player specifications, such as bet limits, paylines and other information. In one embodiment, this local interface configuration information is read from a player tracking card or otherwise input by the player at the local gaming machine. In step 1960, the local gaming machine receives a wager amount and initiate game signal from the player. In step 1965, responsive to the initiate game signal, the local gaming machine requests a game outcome from the remote gaming machine. In some embodiments, this request message, in step 1965, includes the interface configuration parameters such as wager information and pay lines.

In FIG. 19, in step 1970, responsive to the game outcome request message, the remote gaming machine locates a pre-rendered game that meets the received parameters, when possible. Otherwise, in step 1970, the remote gaming machine begins generating a new game or game outcome. In step 1975, output data of the game application begins streaming from the remote to the local gaming machine. In some embodiments, the streamed output data includes a header which provides parameters needed to recreate the outcome or outcomes in the game output data. In some embodiments, the status of the game is then changed from "unsent" to "pending" status. As output data, including game outcomes, are received at the local gaming machine in step 1980, game outcomes are stored as described above. In step 1982, when outcomes of the game application are received at the local gaming machine, in one embodiment, an acknowledge message is sent back to the remote gaming machine.

In FIG. 19, in step 1984, responsive to receiving the acknowledge message, the remote gaming machine marks the status of the game application as "played," or a similar designation indicating that the game has been executed with output(s) sent to the local gaming machine. Then, in step 1986, the length of time that the stored games have been situated at the remote gaming machine is checked against the predetermined time limit of step 1935 to determine whether that time limit has been exceeded. In step 1988, any pre-rendered games that were not used, for which the time limits have expired, can be deleted.

In FIG. 19, on the local gaming machine side, after game outcomes are stored in step 1980, those outcomes can be displayed appropriately in step 1990. The status of the game is marked "played," at the local gaming machine, and credit meters implemented in non-volatile RAM at the local gaming machine are updated accordingly, in step 1992.

Figure 20:
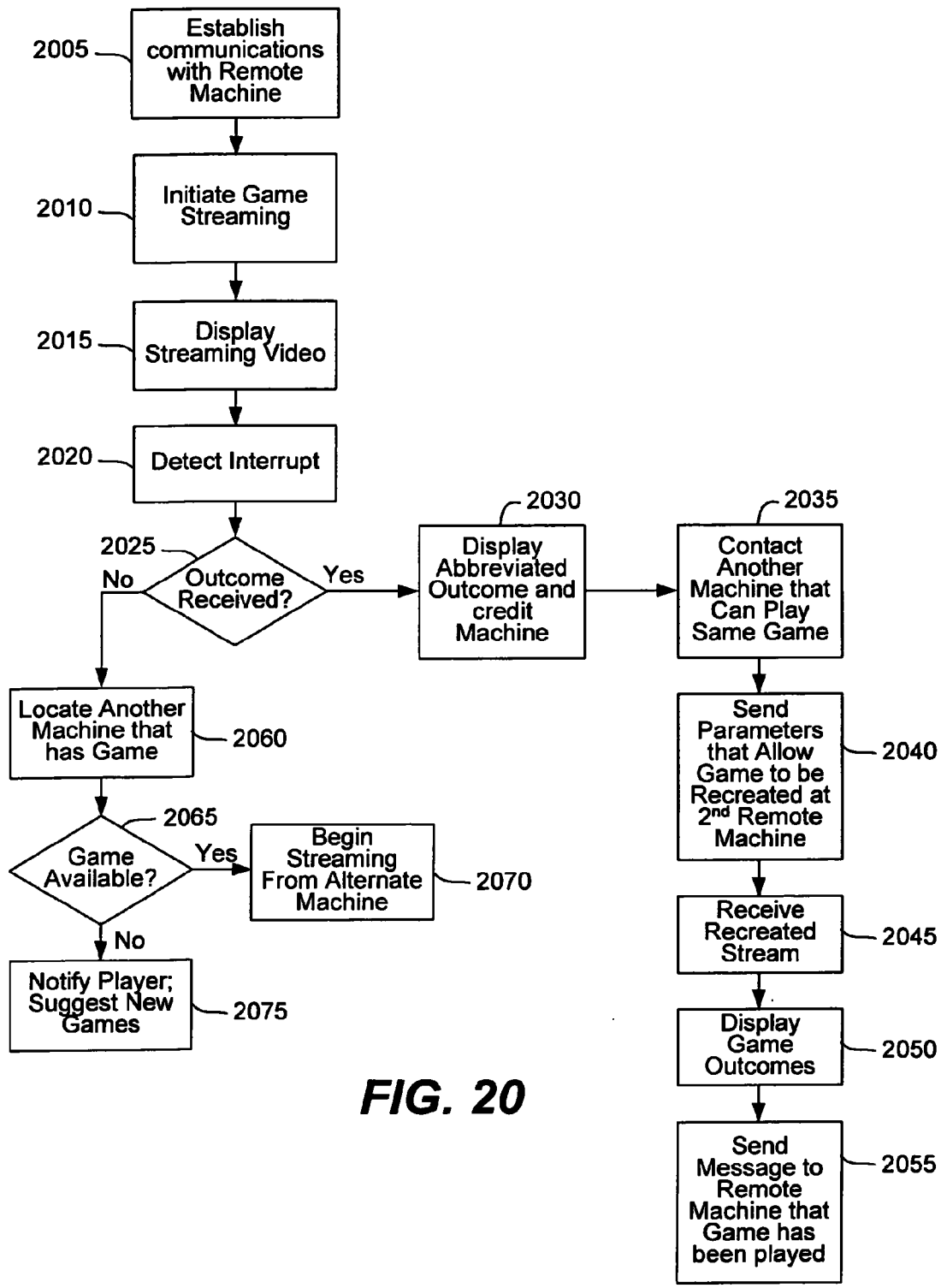
FIG. 20 shows a method 2000 of remote gaming for providing a game of chance, including a scheme for responding to network failures, in accordance with one embodiment of the present invention.

FIG. 20 shows a method 2000 of remote gaming for providing a game of chance, including a scheme for responding to network failures, in accordance with one embodiment of the present invention. In step 2005, communications are established between the local gaming machine and remote gaming machine. After communications are established, in step 2010, streaming of output data from a game application is initiated from the remote gaming machine to the local gaming machine, as described above. The streamed video components of the output data are displayed at the local gaming machine, in step 2015, as described above.

In FIG. 20, in step 2020, an interrupt is detected. This interrupt represents any loss of communications or other interference with communications between the local gaming machine and remote gaming machine. Such an interrupt may often be detected when acknowledgement messages, such as those described above in steps 1950 and 1982 of FIG. 19 are not received at the local gaming machine or remote gaming machine. In some situations, a network interrupt condition, in step 2020, may occur as results are being displayed on the display of the local gaming machine. Thus, in some embodiments, it is beneficial to place recreation game parameters, that is parameters allowing the streamed output data to be recreated, at the head of the stream of output data. In step 2020, in some embodiments, after an interrupt is detected, an attendant request message may be sent to a computer or other data processing device operated by a casino attendant, requesting assistance.

In FIG. 20, in step 2025, the local gaming machine determines whether the outcome of the executing game application has been received. In step 2025, when the outcome has been received, the outcome is displayed and the machine credit meter is updated accordingly in step 2030, in some embodiments. Then, in step 2035, the local gaming machine identifies another gaming machine in the system that can replace the previous remote gaming machine and provide the same game application. Techniques for identifying another suitable remote gaming machine that can play the same game are described above. In step 2040, after an appropriate other remote gaming machine is identified, game play history and parameters received at the local gaming machine are sent to the new remote gaming machine, allowing game play to be recreated at the new remote gaming machine. Then, the interaction described above between the local gaming machine and the original remote gaming machine is reinitiated, with the new or second remote gaming machine providing the functionality of the first remote gaming machine, beginning when the interrupt was originally detected in step 2020. Thus, in step 2045 a recreated stream of output data is received at the local gaming machine from the second remote gaming machine. Accordingly, in step 2050, the recreated game outcomes can be displayed at the local gaming machine, and in step 2055, an acknowledge message can be sent back to the second remote gaming machine, indicating that the game has indeed been played. Accordingly, the game play status for that game at the remote gaming machine can be updated to "played" status.

In FIG. 20, returning to step 2025, when an outcome has not yet been received at the local gaming machine after an interrupt is detected, in step 2060, the local gaming machine attempts to locate another gaming machine in the network that has the game that was requested for play. In step 2065, when the game is available on another gaming machine, the local gaming machine interacts with the newly identified remote gaming machine, as described above, to begin streaming the output data from the new remote gaming machine, in step 2070. Returning to step 2065, when the requested game application is not available on any other gaming machines in the network, in step 2075, a notification message is displayed on the display of the local gaming machine, indicating to the player that the requested game application is not available, and preferably, suggesting a similar game to the player.

Figure 21:
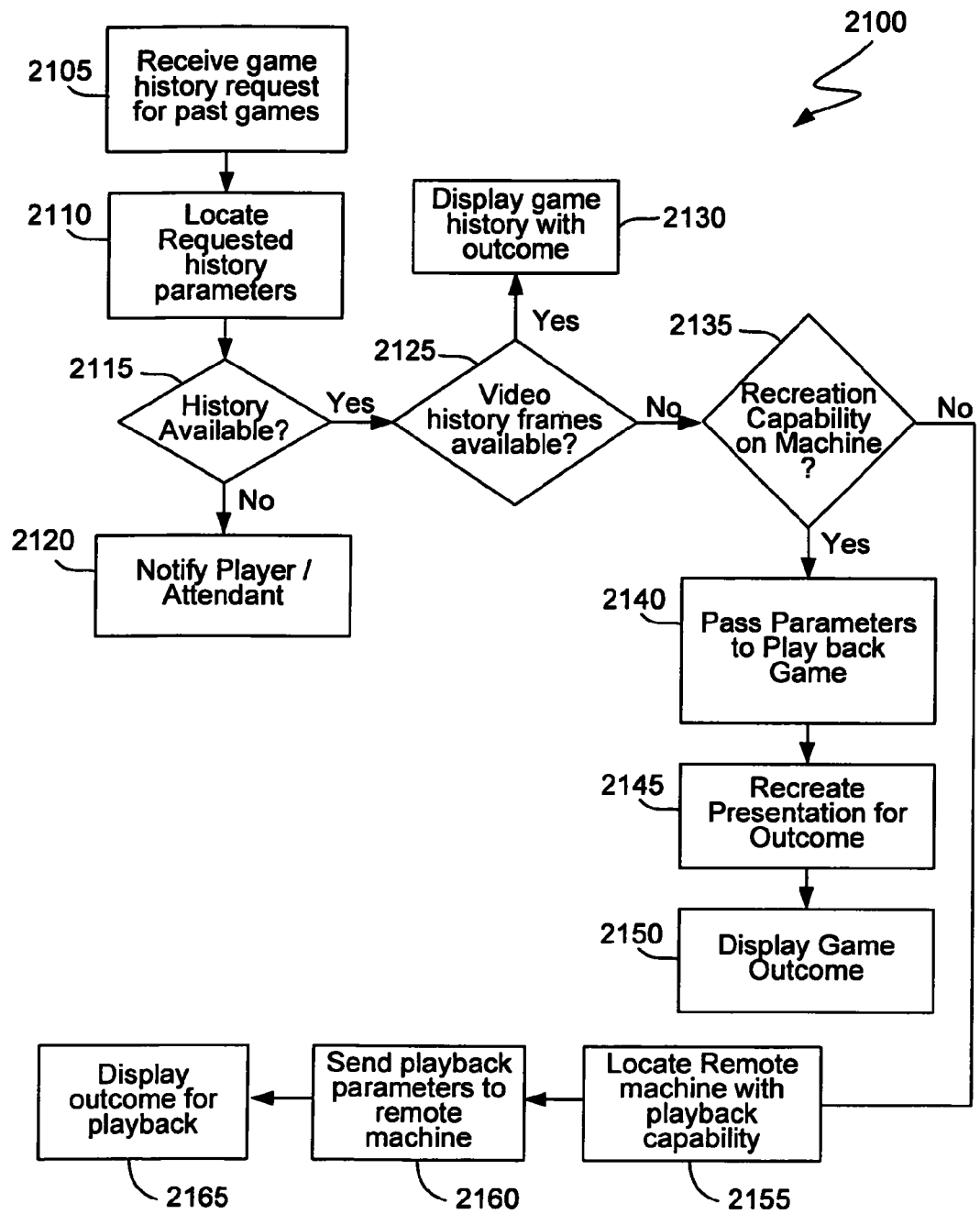
FIG. 21 shows a method of addressing game history disputes at a gaming machine, performed in accordance with one embodiment of the present invention.

FIG. 21 shows a method of addressing game history recalls at a gaming machine, performed in accordance with one embodiment of the present invention. In method 2100, game history information preferably stored in non-volatile memory of a local gaming machine and/or remote gaming machine is used to resolve disputes or for auditing purposes. In step 2105, when a dispute arises, a game history request for a previously played game is received. In one embodiment, this request message is received at a server or other data processing device, such as a handheld unit, held by a casino attendant. Responsive to the game history request, in step 2110, the game history parameters associated with the particular game in dispute are located, often in a bank of non-volatile memory at the local gaming machine, and/or remote gaming machine, depending on the desired implementation as described above. In some situations, in step 2115, a game history is unavailable. Such may be the case when the game history of the gaming dispute has been overwritten or otherwise deleted. In these situations, in step 2120, the player and/or the attendant is notified that the dispute cannot be resolved. Returning to step 2115, when the requested game history is available, the method proceeds to step 2125 to determine whether a video history of the received frames of output data of that game are available. When such frames are available, in step 2130, the video history is retrieved and provided as the game history, including the outcomes of that game. This game history can be displayed on the data processing device or operated by casino personnel.

In FIG. 21, returning to step 2125, when the video history is not available, in step 2135, it is determined whether the local gaming machine on which the game was played can recreate the game outcome in dispute, for example, when the game and same parameters are still available on the local gaming machine. When the game can be recreated, in step 2140, the game parameters are retrieved to play back the game. Then, in step 2145, the presentation of outcomes is recreated, and displayed on a display of the gaming machine in step 2150.

In FIG. 21, returning to step 2135, when the gaming machine does not have recreation capability, in step 2155, a remote gaming machine with the particular game application and having playback capability to play back the game using the supplied game history parameters is identified, using techniques described above. In many instances, a suitable remote gaming machine is the original remote gaming machine that provided the game that is disputed. When a suitable remote gaming machine or central server that can recreate the game identified, in step 2155, the method proceeds to step 2160, in which the play back parameters are sent to the identified remote gaming machine to recreate the gaming dispute. Then, in step 2165, the game outcome is generated and displayed to resolve the dispute.

Those skilled in the art should understand that methods performed in accordance with embodiments of the present invention can include part or all of method 800 in FIGS. 8A and 8B, part or all of method 1900 in FIG. 19, part or all of method 2000 of FIG. 20, part or all of method 2100 of FIG. 21, and combinations of steps described with respect to the various FIGS. 8A, 8B and 19-21.

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although the foregoing invention has been described in some detail for purposes of clarity of understanding, it will be apparent that certain changes and modifications may be practiced within the scope of the appended claims.

What is claimed is:

1. A method for providing games of chance on gaming machines over a data network, the method comprising the steps of:
   receiving a player input at an input terminal of a local gaming machine, the player input requesting a first game application, the local gaming machine including a gaming controller including a processor configured to independently execute game applications, the game applications including executable game code, wherein execution of the game applications includes the generation of output data, and wherein the local gaming machine is configured to store a plurality of game applications including a second game application;
   determining a location of the first game application as being at a remote gaming machine, the remote gaming machine including a gaming controller including a processor configured to independently execute game applications, wherein the determining includes identifying the remote gaming machine as one of a plurality of gaming machines having the first game application and accessing a location record showing the gaming machines having the first game application, and wherein the remote gaming machine is configured to store a plurality of game applications including the first game application;
   determining, by the gaming controller of the machine, whether one of a plurality of instances of the first game application is available for execution on the remote gaming machine;
   reserving, by the gaming controller of the local gaming machine, an instance of the first game application on the remote gaming machine when it is determined that the first game application is available for execution by the remote gaming machine;
   receiving, at the local gaming machine, a game application request message for the second game application from the remote gaming machine over the data network;
   determining whether one of a plurality of instances of the second game application is available for execution on the local gaming machine; and
   reserving an instance of the second game application on the local gaming machine when it is determined that the second game application is available for execution by the local gaming machine.

2. The method of claim 1, further comprising the step of:
   releasing the reserved instance of the first game application on the remote machine after passing of a predetermined time period.

3. The method of claim 2, wherein the step of releasing the reserved instance includes:
   erasing data associated with the reserved instance from a memory.

4. The method of claim 1, further comprising the steps of:
   receiving, responsive to execution of the instance of the first game application on the remote gaming machine, output data of the executing first game application from the remote gaming machine over the data network; and
   storing the received output data in a memory.

5. The method of claim 1, further comprising the steps of:
   receiving, responsive to execution of the instance of the first game application on the remote gaming machine, output data of the executing first game application from the remote gaming machine over the data network; and
   providing the received output data on the interface of the local gaming machine.

6. The method of claim 5, further comprising the steps of:
   receiving a generic output data component from a storage medium; and
   providing the generic output data component on the interface of the local gaming machine.

7. The method of claim 6, wherein the storage medium is situated at the local gaming machine.

8. The method of claim 6, wherein the storage medium is situated at the remote gaming machine.

9. The method of claim 5, further comprising the steps of:
   capturing one or more game parameters from one or more frames of the received output data; and
   storing the captured game parameters in a memory.

10. The method of claim 9, wherein the memory is a non-volatile memory.

11. The method of claim 5, further comprising the step of:
    capturing one or more game parameters from the output data on a communications channel.

12. The method of claim 5, further comprising the step of:
    storing, before providing, the received output data in a memory.

13. The method of claim 12, wherein the memory is a cache memory.

14. The method of claim 1, wherein identifying the remote gaming machine as one of the plurality of gaming machines having the first game application includes:
    identifying the remote gaming machine as the one of the gaming machines having a closest network distance to the local gaming machine.

15. The method of claim 14, wherein identifying the remote gaming machine as the one of the gaming machines having a closest network distance to the local gaming machine includes accessing a routing table.

16. The method of claim 1, wherein identifying the remote gaming machine as one of the plurality of gaming machines having the game application includes:
identifying the remote gaming machine as having an available instance of the game application.

17. The method of claim 1, wherein identifying the remote gaming machine as one of the plurality of gaming machines having the game application includes:
accessing a routing table listing a sequence of gaming machines.

18. The method of claim 17, wherein the sequence of gaming machines is arranged according to most often accessed gaming machines.

19. The method of claim 18, wherein the sequence of gaming machines is arranged according to most often accessed game applications.

20. The method of claim 1, further comprising the steps of:
receiving user interaction signals from the input terminal of the local gaming machine;
sending the user interaction signals from the local gaming machine to the remote gaming machine over a control channel of the data network.

21. The method of claim 1, further comprising the steps of:
identifying interface requirements of the first game application;
determining whether the identified interface requirements are compatible with an interface of the local gaming machine, wherein the interface requirements of the first game application include ones selected from the group consisting of input button information, payline information, denominations, paytable information, processor speed, memory availability, and hard disk space.

22. The method of claim 1 further comprising the step of:
receiving, at the input terminal, a game configuration input setting parameters for the first game application.

23. The method of claim 22, further comprising the step of:
sending the game configuration input to the remote gaming machine.

24. The method of claim 22, wherein the parameters include one selected from the group consisting of payline information, a wager amount, and a jackpot.

25. The method of claim 1, wherein determining whether one of a plurality of instances of the first game application is available for execution on the remote gaming machine includes:
determining compliance of the first game application with interface requirements.

26. The method of claim 1, wherein determining whether one of a plurality of instances of the first game application is available for execution on the remote gaming machine includes:
determining compliance of the first game application with licensing requirements.

27. The method of claim 1, wherein determining whether one of a plurality of instances of the first game application is available for execution on the remote gaming machine includes:
determining compliance of the first game application with jurisdictional requirements.

28. The method of claim 1, further comprising the steps of:
executing the instance of the second game application on the processor of the local gaming machine; and
sending output data of the executing second game application from the local gaming machine to the remote gaming machine over the data network.

29. The method of claim 28, further comprising the steps of:
retrieving a generic output data component from a storage medium at the local gaming machine; and
providing the generic output data component to the remote gaming machine.

30. The method of claim 28, further comprising the steps of:
providing one or more game parameters in one or more frames of the sent output data.

31. The method of claim 30, further comprising the steps of:
storing the game parameters in a memory situated at the local gaming machine.

32. The method of claim 31, wherein the memory is a non-volatile memory.

33. The method of claim 28, further comprising the step of:
retrieving, before sending the output data, a component of the output data from a storage medium.

34. The method of claim 33, wherein the component of the output data is selected from the group consisting of audio data, video data, and paytable data.

35. The method of claim 28 further comprising the step of:
providing authentication information in a frame of the output data.

36. The method of claim 35, wherein the authentication information is embedded in the frame as a digital signature.

37. The method of claim 35, wherein the authentication information is provided in a channel associated with a stream of video data.

38. The method of claim 1, wherein the step of determining whether one of a plurality of instances of the second game application is available for execution on the local gaming machine includes:
determining availability of the processor on the local gaming machine to execute the instance of the second game application.

39. The method of claim 1, wherein the step of determining whether one of a plurality of instances of the second game application is available for execution on the local gaming machine includes:
determining compliance of the second game application with jurisdictional requirements.

40. The method of claim 1, wherein the step of determining whether one of a plurality of instances of the second game application is available for execution on the local gaming machine includes:
determining compliance of the second game application with licensing requirements.

41. The method of claim 40, wherein the step of determining availability of the processor on the local gaming machine to execute the instance of the second game application includes:
identifying a further instance of the second game application executing on the processor.

42. The method of claim 40, wherein the step of determining availability of the processor on the local gaming machine to execute the instance of the second game application includes:
identifying an instance of a further game application executing on the processor.

43. The method of claim 1, wherein the step of determining whether one of a plurality of instances of the second game application is available for execution on the local gaming machine includes:
determining availability of a memory on the local gaming machine to execute the instance of the second game application.

44. A local gaming machine for providing games of chance to and from a remote gaming machine in communication with the local gaming machine over a data network, the gaming machine comprising:
  a user interface coupled to receive a player input, the player input requesting a first game application, the first game application including executable game code;
  a communications interface coupled to receive a request from the remote gaming machine over the data network for a second game application, the second game application including executable game code;
  a gaming controller including a processor configured to:
    i) determine a location of the first game application as being at the remote gaming machine, wherein the determination includes identifying the remote gaming machine as one of a plurality of gaming machines having the first game application and accessing a location record showing the gaming machines having the first game application, wherein the remote gaming machine is configured to store and independently execute with a gaming controller including a processor a plurality of game applications including the first game application, and wherein execution of the game applications includes the generation of output data,
    ii) determine whether one of a plurality of instances of the first game application is available for execution on the remote gaming machine,
    iii) reserve an instance of the first game application on the remote gaming machine when it is determined that the first game application is available for execution by the remote gaming machine,
  the gaming controller including the processor of the local gaming machine further configured to:
    iv) reserve an instance of the second game application on the local gaming machine when it is determined that the second game application is available for execution on the local gaming machine, wherein the local gaming machine is configured to store and independently execute a plurality of game applications including the second game application, and
    v) independently execute the instance of the second game application; and
  a streaming module coupled to send output data of the executing second game application from the local gaming machine to the remote gaming machine over the data network.

45. The gaming machine of claim 44, further comprising a receiving module coupled to receive, responsive to execution of the instance of the first game application on the remote gaming machine, output data of the executing first game application from the remote gaming machine over the data network.

46. The gaming machine of claim 45, wherein the gaming controller including the processor is further configured to:
  vi) store the received output data in a memory.

47. The gaming machine of claim 45, wherein the gaming controller including the processor is further configured to:
  vi) provide the received output data to the user interface.

48. The gaming machine of claim 45, wherein the receiving module is further coupled to receive a generic output data component from a storage medium.

49. The gaming machine of claim 45, further comprising:
  a data capture module coupled to:
    i) capture one or more game parameters from one or more frames of the received output data, and
    ii) store the captured game parameters in a memory.

50. The gaming machine of claim 49, wherein the game parameters include a setting selected from the group consisting of a credit meter, a bet meter, a bet history, lines bet, number of credits, side bets, and an outcome history.

51. The gaming machine of claim 45, further comprising:
  a data capture module coupled to capture one or more game parameters from the output data on a video communications channel.

52. The gaming machine of claim 44, wherein the streaming module is further coupled to:
  retrieve a generic output data component from a storage medium; and
  provide the generic output data component to the remote gaming machine.

53. The gaming machine of claim 44, wherein the streaming module is further coupled to:
  provide one or more game parameters in one or more frames of the sent output data.

54. The gaming machine of claim 44, wherein the streaming module is further coupled to:
  retrieve, before sending the output data, a component of the output data from a storage medium.

55. The gaming machine of claim 44, wherein the streaming module is further coupled to:
  provide authentication information in a frame of the output data.

56. In a gaming system including a first gaming machine and a second gaming machine coupled to a data network, a method for providing a game of chance comprising the steps of:
  receiving a player input at an input terminal of the first gaming machine, the player input requesting a first game application, the first gaming machine including a gaming controller including a processor configured to independently execute the game applications, the game applications including executable game code, wherein execution of the game applications includes the generation of output data, and wherein the first gaming machine is configured to store a plurality of game applications including a second game application;
  determining a location of the first game application as being at the second gaming machine, the second gaming machine including a gaming controller including a processor configured to independently execute game applications, wherein the determining includes identifying the second gaming machine as one of a plurality of remote gaming machines coupled to the data network having the first game application and accessing a location record showing the remote gaming machines having the first game application, and wherein the second gaming machine is configured to store a plurality of game applications including the first game application;
  determining, by the gaming controller of the local gaming machine, that one of a plurality of instances of the first game application is available for execution on the second gaming machine;
  reserving an instance of the first game application on the second gaming machine when it is determined that the first game application is available for execution;
  executing the instance of the first game application on the processor of the second gaming machine, wherein execution of the game application includes the generation of output data;
  sending output data of the executing first game application from the second gaming machine to the first gaming machine over the data network;

providing the output data on the interface of the first gaming machine;

receiving a game application request message for the second game application from the second gaming machine over the data network after the second gaming machine determines that the second game application is not located at the second gaming machine and after the second gaming machine determines that the second game application is located at the first gaming machine, wherein the determination includes identifying the first gaming machine as one of a plurality of gaming machines having the second game application and accessing a location record showing the gaming machines having the second game application;

determining, by the gaming controller of the second gaming machine, whether one of a plurality of instances of the second game application is available for execution on the first gaming machine; and reserving, by the gaming controller of the second gaming machine, an instance of the second game application on the first gaming machine when it is determined that the second game application is available for execution by the first gaming machine.

57. The method of claim 56, wherein the interface requirements of the first game application are stored in an interface record.

58. The method of claim 56, wherein the first gaming machine is a local gaming machine.

59. The method of claim 58, further comprising the step of:
accessing a routing table which identifies the second gaming machine as one of the remote gaming machines.

60. The method of claim 56, wherein the first gaming machine is a slot machine.

61. The method of claim 56, wherein the first gaming machine is a personal digital assistant ("PDA").

62. The method of claim 56, wherein the first gaming machine is a cell phone.

63. The method of claim 56, wherein the first gaming machine is an interactive television enabled device.

64. The method of claim 56, further comprising the steps of:
detecting a network error condition;
executing, responsive to detecting the network error condition, a further instance of the first game application on a processor of a third gaming machine in the gaming system; and
transferring game play from the second gaming machine to the third gaming machine, including maintaining a status of the game play.

65. The method of claim 64, wherein the step of transferring game play includes:
sending output data of the executing first game application from the third gaming machine to the first gaming machine over the data network.

66. The method of claim 64, wherein the step of transferring game play includes:
providing game parameters to the third gaming machine.

67. The method of claim 64, wherein the step of transferring game play includes:
providing game play history information to the third gaming machine.

68. A local gaming machine for providing games of chance to and from a remote gaming machine in communication with the local gaming machine over a data network, the gaming machine comprising:
a user interface coupled to receive a player input, the player input requesting a first game application, the first game application including executable game code;
a communications interface coupled to receive a request from the remote gaming machine over the data network for a second game application after the remote gaming machine determines that the second game application is located at the local gaming machine, the second game application including executable game code;
gaming controller including a processor configured to:
i) determine a location of the first game application as being at the remote gaming machine, wherein the determination includes identifying the remote gaming machine as one of a plurality of gaming machines having the first game application and accessing a location record showing the gaming machines having the first game application, the remote gaming machine including a gaming controller including a processor configured to independently execute the first game application without interrupting other game applications executing at the remote gaming machine;
iv) determine whether one of a plurality of instances of the first game application is available for execution on the remote gaming machine, wherein the remote gaming machine is configured to store and independently execute with a gaming controller including a processor a plurality of game applications including the first game application, and wherein execution of the game application includes the generation of output data,
v) reserve an instance of the first game application on the remote gaming machine when it is determined that the interface requirements are compatible and that the first game application is available for execution by the remote gaming machine,
the gaming controller including the processor of the local gaming machine further configured to:
v) reserve an instance of the second game application on the local gaming machine when it is determined that the second game application is available for execution wherein the local gaming machine is configured to store and independently execute a plurality of game applications including the second game application, and
vi) independently execute the instance of the second game application without interrupting other game applications executing at the local gaming machine; and
a streaming module coupled to send output data of the executing second game application from the local gaming machine to the remote gaming machine over the data network;
a main display configured to display the first game application; and
a value input device configured to accept an indication of a wager for playing the first game application.

* * * * *